(12) United States Patent
Madhavarapu et al.

(10) Patent No.: US 9,785,510 B1
(45) Date of Patent: Oct. 10, 2017

(54) VARIABLE DATA REPLICATION FOR STORAGE IMPLEMENTING DATA BACKUP

(71) Applicant: Amazon Technologies, Inc., Reno, NV (US)

(72) Inventors: Pradeep Jnana Madhavarapu, Mountain View, CA (US); Anurag Windlass Gupta, Atherton, CA (US); Yan Valerie Leshinsky, Kirkland, WA (US); Samuel James McKelvie, Seattle, WA (US); James McClellan Corey, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 385 days.

(21) Appl. No.: 14/274,366

(22) Filed: May 9, 2014

(51) Int. Cl.
*G06F 7/00* (2006.01)
*G06F 17/00* (2006.01)
*G06F 11/14* (2006.01)
*G06F 17/30* (2006.01)

(52) U.S. Cl.
CPC ........ *G06F 11/1451* (2013.01); *G06F 17/302* (2013.01)

(58) Field of Classification Search
CPC ........... G06F 17/30578; G06F 11/1474; G06F 17/30283; G06F 11/1451; G06F 17/302
USPC ........... 707/634, 649, 683, 999.104, 999.202
See application file for complete search history.

(56) References Cited

U.S. PATENT DOCUMENTS

| | | |
|---|---|---|
| 6,199,074 B1 | 3/2001 | Kern et al. |
| 6,374,267 B1 | 4/2002 | Tam |
| 7,330,859 B2 | 2/2008 | Gupta et al. |
| 8,041,679 B1 | 10/2011 | Narayanan |
| 8,065,278 B2 | 11/2011 | Beatty et al. |
| 8,244,679 B1 * | 8/2012 | Bilsborough ....... G06F 17/3015 707/640 |
| 8,478,726 B2 | 7/2013 | Habermann et al. |
| 8,566,286 B1 | 10/2013 | Hawton et al. |
| 8,626,709 B2 | 1/2014 | Isaacson et al. |
| 8,725,934 B2 * | 5/2014 | Batwara .............. G06F 12/0246 711/103 |
| 8,825,938 B1 * | 9/2014 | Ellard ................. G06F 12/0246 711/103 |
| 8,892,938 B1 * | 11/2014 | Sundaram ........... G06F 11/2092 707/650 |
| 2010/0262717 A1 * | 10/2010 | Critchley ................ H04L 12/42 709/251 |

(Continued)

*Primary Examiner* — Md. I Uddin
(74) *Attorney, Agent, or Firm* — Robert C. Kowert; Meyertons, Hood, Kivlin, Kowert & Goetzel, P.C.

(57) ABSTRACT

A log-structured data store implementing data backup may implement variable data replication. Write requests may be received at different storage nodes maintaining respective replicas of a portion of a log for data maintained in the log-structured data store. Log records indicating the write requests may be stored in the respective replicas of the log portions at the different storage nodes. The log records may be sent to a backup data store to be durability persisted as part of an archived version of the log. At some of the storage nodes, in response to determining that the log records have been durably persisted in the backup data store, storage space for the log records may be reclaimed. In other remaining storage nodes, the log records may be retained and made accessible for servicing read requests.

21 Claims, 14 Drawing Sheets

(56) References Cited

U.S. PATENT DOCUMENTS

| | | | |
|---|---|---|---|
| 2012/0221715 A1* | 8/2012 | Hamada | H04L 67/22 709/224 |
| 2013/0262388 A1 | 10/2013 | Sorenson et al. | |
| 2014/0324785 A1* | 10/2014 | Gupta | G06F 17/30578 707/689 |

* cited by examiner

VARIABLE DATA REPLICATION FOR STORAGE IMPLEMENTING DATA BACKUP

BACKGROUND

Log-structured storage developed in order to provide a more efficient means for storing data in persistent storage devices. Data and metadata changes are sequentially recorded as log records in a log structure reducing the number of operations to persist the data and metadata changes. For systems that frequently add and/or modify data, such as database systems, log-structured storage reduces the latency for recording new data as well as modifying data already stored. Log records are typically stored in storage according to a log record sequence so that log records that are dependent upon prior log records may be processed in a correct order.

Situating log-structured storage systems in distributed system architectures may introduce various complications that increase costs of log-structured storage. While increasing the number of available copies of data may allow for greater availability for processing access requests to the data store, storage costs may also correspondingly increase. Other distributed system concerns, such as concurrency control or durability techniques may also increase the resource cost to implement log-structured storage. For log-structured storage systems that may rely upon new or high-cost components, increasing the resources to implement these techniques may further resource costs. Therefore, improving resource efficiency and maintaining availability, concurrency, and/or durability may significantly reduce the costs of implementing a log-structured data store in a distributed system architecture.

BRIEF DESCRIPTION OF THE DRAWINGS

FIG. 1A is a block diagram illustrating variable data replication for storage implementing data backup, according to some embodiments.

Figure 1B:
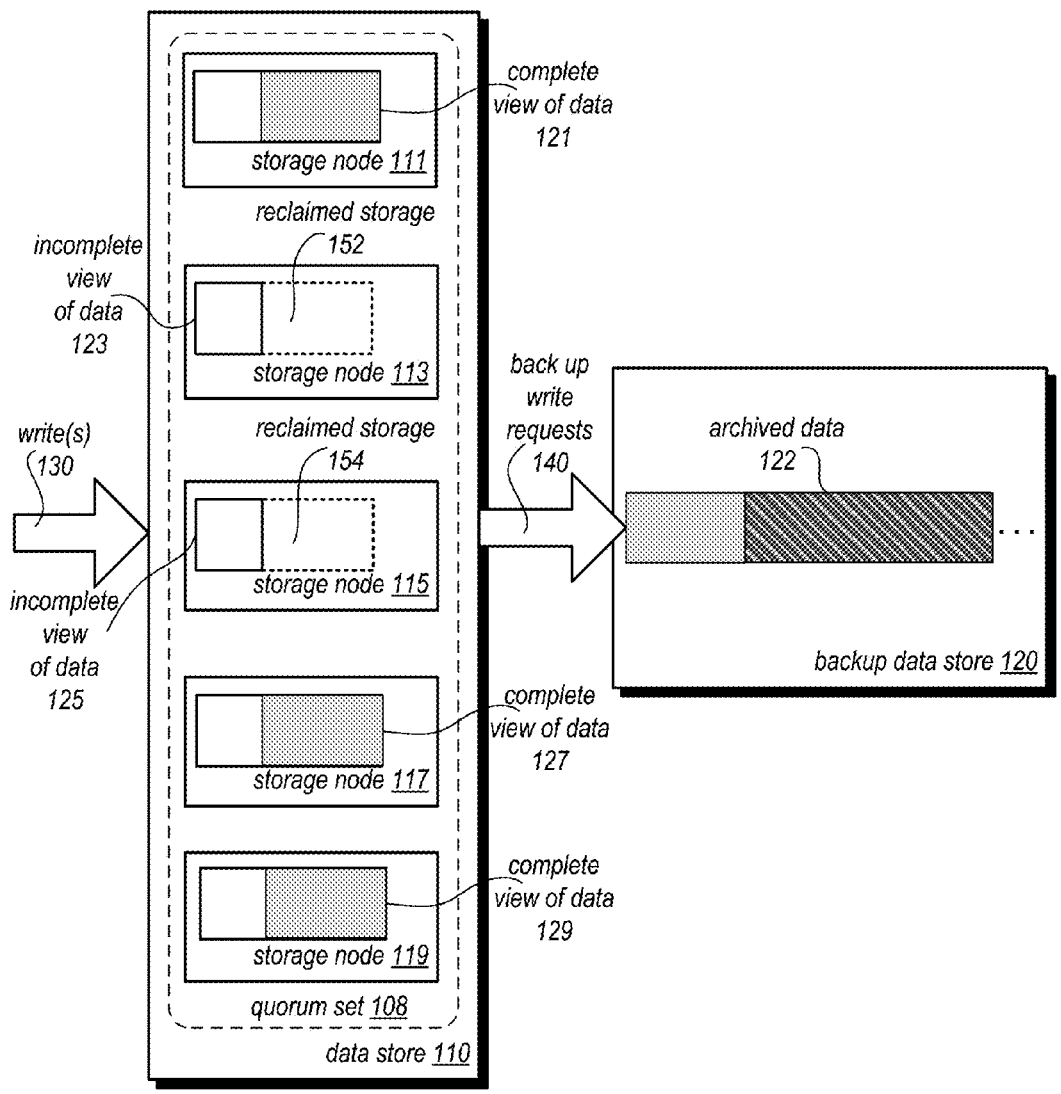
FIG. 1B is a logical illustration of data maintained in a data store implementing data backup, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of variable data replication for storage implementing data backup are described herein. Many storage systems implement various mirroring, replication, or other duplication techniques as a way to ensure durability of data maintained in data storage in the face of network, media or box failures. A quorum solution, for example, may be implemented to require successful acknowledgements of write requests to data from 3/5 copies of the data (which may also be spread across 3 data centers). While these durability techniques help both with latency (as performance outliers can be tolerated) and with durability (as failures may be tolerated), implementation costs may be greatly increased. In order to further buttress durability, some storage systems may also provide a backup mechanism to secondary storage, for example, to provide recovery capabilities if the storage system experiences failure. Backup storage mechanisms may also provide enhanced durability for data through various similar replication schemes implemented as part of the backup storage system.

In various embodiments, distributed storage systems may provide access to a view of data (or a reconstruction/ restoration to a state of data) maintained in the distributed storage system, which may correspond to the data at a specific point in time. For instance, storage systems may provide access to the state of particular data pages or data blocks at a certain time. Write requests, or other updates or modifications to data maintained in the distributed storage system may be stored (e.g., by applying the write request or logging the write request). Over time as more changes are made to the data, some of the write requests may be sent to a backup storage system to be stored in an archived version of the data. Some storage nodes may then no longer need to maintain a complete view of the data that includes these write requests—as the durability of the complete view of the data may be reinforced by the backup storage system. Storage space for these write requests at these storage nodes may be reclaimed in order to make space available for storing other data. Remaining storage nodes may still store the write requests in order to maintain a complete view of the data accessible for read requests from a storage client.

In at least some embodiments, a log-structured distributed storage system may be implemented. In such embodiments, log records indicating changes to data maintained in the log-structured storage system may be included in a log, which may be accessible or readable to provide the state of the data at the specific point in time. As the log grows to include new log records indicating changes to data maintained in log-structured storage, determinations may be made as to which portions of the log (e.g., oldest records, log records between certain time intervals) should be retained in order to be readable/accessible, and which portions of the log may no longer need to be retained. Log-structured storage systems may also incorporate durability schemes for data maintained in log-structured storage. Log records included in a log, for example, may be replicated across multiple locations, such as storage nodes in a quorum set, so that the durability of the log may be safeguarded.

In some embodiments, a backup storage system may be implemented to store older portions of the log (such as other portions of the log which would otherwise be reclaimed in the log-structured storage to make room for new log records) so that the log records may still be retained (even if they are not easily obtainable from the backup storage system for future access). In such embodiments, it may be possible to significantly reduce the amount of storage resources being kept in the log-structured storage system, and thus the storage cost, by implementing variable replication of the log. Consider the example where multiple storage nodes maintain respective replicas of a log for data maintained in a log-structured data store. Over time portions of the log maintained at these replicas may also be sent to and stored at a backup storage system. Durability for the log may now be provided both by the storage nodes in the log-structured storage system maintaining the log and in the log portions stored in the backup storage system. In various embodiments, the number of replicas of the log maintained at storage nodes in the log-structured storage system may be reduced, lowering the storage resources used for storing the log in the log-structured data store without affecting the overall durability of the log. This reduction in replicas may, in some embodiments, depend on the performance or availability of remaining storage nodes with complete replicas to serve requests (such as read requests) which may require access to log records which they maintain.

FIG. 1A is a block diagram illustrating variable data replication for storage implementing data backup, according to some embodiments. Data store 110 may store data for a client. One or more servers, systems or devices, such as computing system 1200 described below with regard to FIG. 12 may be configured to implement data store 110. Clients for which data may be stored in log-structured data store 110, may be any type of application, device, or system (e.g., computing system 1200 discussed below with regard to FIG. 12) that may be configured to communicate with or access data stored at data store 110.

Data store 110 may, in some embodiments, implement multiple storage nodes, such as storage nodes 111, 113, 115, 117 and 119, to store data for a storage client. In various embodiments, storage nodes 111-119 may each store a respective replica of a of data. In some embodiments, the data may be a log for a log-structured data store. As illustrated in FIG. 1A, storage node 111 stores complete view of data 121, storage node 113 stores incomplete view of data 123, storage node 115 stores incomplete view of data 125, storage node 117 stores complete view of data 127, and storage node 119 stores complete view of data 129. As discussed in detail below, some storage nodes store different views of the data, such as a complete view of the data, while other storage nodes store an incomplete view of the data. Storage nodes 111-119 may be implemented as virtual instances, servers, or other systems or devices, such as computing system 1200 described below with regard to FIG. 12, or may correspond to separate storage devices (e.g., hard disc drives (HDDs), solid state drives (SSDs), or other form of block-based persistent storage device) which are implemented within a single or multiple computing systems. A data block of a block-based storage device may be a logical range of the block-based storage device storing a range of data (e.g., a multiple of 2 or more bits). Storage nodes 111-119 may stand alone, or grouped together to implement a quorum set of storage nodes 108 A quorum set of storage nodes may include any storage nodes that may be used to satisfy a quorum requirement (e.g., a write quorum requirement or a read quorum requirement). In some embodiments, members of the quorum set for client data may each maintain a respective replica of the data for a storage client. Backup data store 120 may provide persistent, block-based storage to store an archived version of the data maintained in data store 110. Backup data store 120 may, in some embodiments, be a storage system remote from log-structured data store 110.

As illustrated in FIG. 1A, write request(s) 130 may be sent to and received at different storage nodes, 111-119, in data store 110. Write requests may be directed toward particular portions of data, such as a particular data page or data block. For log structured data stores, these write requests may be transformed or used to generate one or more log records that describe the write request 130. In some embodiments, the write request(s) 130 may themselves be log records, such as described below with regard to FIG. 5A. However described write requests may be stored in different respective replicas (e.g., 121, 123, 125, 127, and 129) of the data maintained at the storage nodes 111-119. In various embodiments, storage nodes 111-119 may implement a quorum set 108 for the log, and thus write requests may need to be stored and acknowledged from enough of storage nodes 111-119 in order to satisfy a write quorum requirement (e.g., 3/5 storage nodes). In at least some embodiments, storage nodes 111-119 may perform a peer-to-peer synchronization protocol that may ensure that each storage node 111-119 receives a copy of a particular write request 130 to be maintained in the respective replica of the data at the storage node.

Overtime, write requests may be backed up 140 to backup data store 120 to be stored in a durably persisted archived version of the data 122. For example, in a log-structured data store back up of log records 140 may be performed according to various data retention policies for maintaining log records in data store 110 (e.g., oldest log records, log records in a particular portion of the log portion). Back up of write requests 140 may, in some embodiments, be performed asynchronously (e.g., as a background process performed at some or all of storage nodes 111-119). In various embodiments, a backup component or module may direct the backup 140. Archived data 122 may be a full or incomplete version of the data, which may be determined according to various data retention policies or techniques (e.g., storing data snapshots instead of every log record in a log-structured data store).

FIG. 1B is a logical illustration of write requests for data maintained in a data store implementing data backup, according to some embodiments. Data 160, in a log-structured data store may logically illustrate the log records indicating the state of data maintained in the data store 110 over time. In various embodiments, the backup data store 120 may be used in conjunction with data store 110 to implement various data retention policies for data 160. For example, as illustrated in FIG. 1B, some write requests (corresponding to the state of data further back in time) may be durably maintained in an archived version of data 160, but are inaccessible to storage clients of data store 110. Thus, archived writes 166 may include writes that are only maintained in backup data store 120 which are not directly readable, but which may be used as part of a recovery or restoration operation. Some write requests may have already been stored in backup data store 120, but are still identified as readable (or otherwise accessible) to storage clients. These log records may be considered as archived writes included in a read accessible view of the data 164. Recently received write requests, which may not yet be stored in backup data store 120, may be stored in an unarchived writes portion 162.

In various embodiments, write requests in a readable portion 172 (which may include both write requests in unarchived writes 162 and archived writes that are read accessible 164) may be maintained at storage nodes maintaining a complete view of the data. For instance, as illustrated in FIG. 1A, storage nodes 111, 117 and 119 each maintain respective replicas of the data with a complete view of the data (121, 127 and 129). A complete view of the data may be a view of the data with write requests acknowledged as durable to a client (e.g., satisfy a write quorum requirement) applied. For instance, if write requests to particular data pages or data blocks were acknowledged, then a read request may be able to access the particular data pages or data blocks in their state as of the application of the write requests. These storage nodes may be available to service read requests for data maintained in data store 110 by accessing the complete view of the data.

In some embodiments, storage nodes may maintain a smaller portion of data in readable portion 172. Storage nodes 113 and 115, in FIG. 1A for example, maintain respective incomplete views of data 123 and 125. Over time as more write requests are received at storage nodes maintaining an incomplete view of the data (e.g., as the result of write requests received at the storage nodes or write request received from a peer-to-peer synchronization protocol), some of the write requests maintained at a storage node maintaining an incomplete view of the data may become durably persisted in backup data store 120. Storage nodes 113 and 115, for instance, may detect or determine that these write requests are now in the archived data 122 in backup data store 120, and in response, reclaim the storage space for those write requests, 152 and 154 (e.g., reclaimed data pages, data blocks, or log records), in order to store other data (such as other write requests for the data or data maintained for another storage client). For example, the storage space may be marked or identified as available for storing other data, or the write requests in the storage space may be deleted or removed. Storage nodes maintaining incomplete views of data may be unable to process read requests that require access to write requests in archived writes included in a read accessible view of the data 164, in some embodiments. However, these storage nodes may still be able to process write requests (even if the write requests themselves may be reclaimed at a later time). In this way, write performance may be maintained while some of the storage cost for write performance may be recaptured by efficiently replicating write requests that are maintained for read performance.

The number of storage nodes maintaining complete views of the data and incomplete views of the data may vary according to different performance or durability objectives. For instance, if two storage nodes are sufficient to service read requests for data in data store 110, then 2 storage nodes may maintain complete views of the data, while other storage nodes storing replicas of the data (e.g., other storage nodes which may be implemented to sufficiently service write requests) may maintain incomplete views of the data. In at least some embodiments, the number of storage nodes maintaining a complete view of the data may be less than a number of storage nodes sufficient to satisfy a write quorum requirement (e.g., 2 storage nodes maintaining a complete log portion when at least 3 storage nodes may be required to satisfy a write quorum requirement). Additionally, in some such embodiments the write quorum requirement itself may also be less than all of the storage nodes in the quorum set. In various embodiments, if a storage node maintaining a complete view of the data fails, such as storage node 111, write requests that may be needed to realize a complete view of the data may be recovered from another storage node maintaining a complete view of the data (or the effects of the write requests such as the data pages or data blocks altered by the write requests), such as storage nodes 117 and 119 or from the archived data 122 in backup data store 120.

Variable replication of data in storage system implementing data backup may allow balancing storage loads for multiple different storage clients storing data among storage nodes that implement a multi-tenant storage system (e.g., a system where the data or work for different clients may be performed or reside at the same component). For example, in some embodiments, a storage node may maintain a complete view of the data for one storage client, while maintaining an incomplete view of the data for another storage client. In this way the relatively large storage space required to maintain a complete view of data may be balanced out with a relatively small amount of storage space required to maintain an incomplete view of data.

Please note, FIGS. 1A and 1B are provided as a logical illustrations of variable data replication for storage implementing data backup, and are not intended to be limiting as to the physical arrangement, size, or number of components, modules, or devices, implementing a data store or backup data store. For example, in some embodiments, each storage node may correspond to a particular storage device in a single computing system or device (e.g., a storage server implementing a RAID architecture). In another example, as described below with regard to FIGS. 2-8, each of the storage nodes may be implemented as part of a network-based, distributed storage service (which may provide multi-tenant storage for multiple different clients of the network-based distributed storage service).

The specification first describes an example of a log-structured data store implemented as a distributed storage service that implements variable data replication for log-structured storage implementing data backup. The distributed storage service may store data for many different types of clients, in various embodiments. One such client may be a network-based database service, described in further detail below. Included in the description of the example network-based database service are various aspects of the example network-based database service along with the various interactions between the database service and the distributed storage service. The specification then describes a flowchart of various embodiments of methods for variable data replication for storage implementing data backup. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
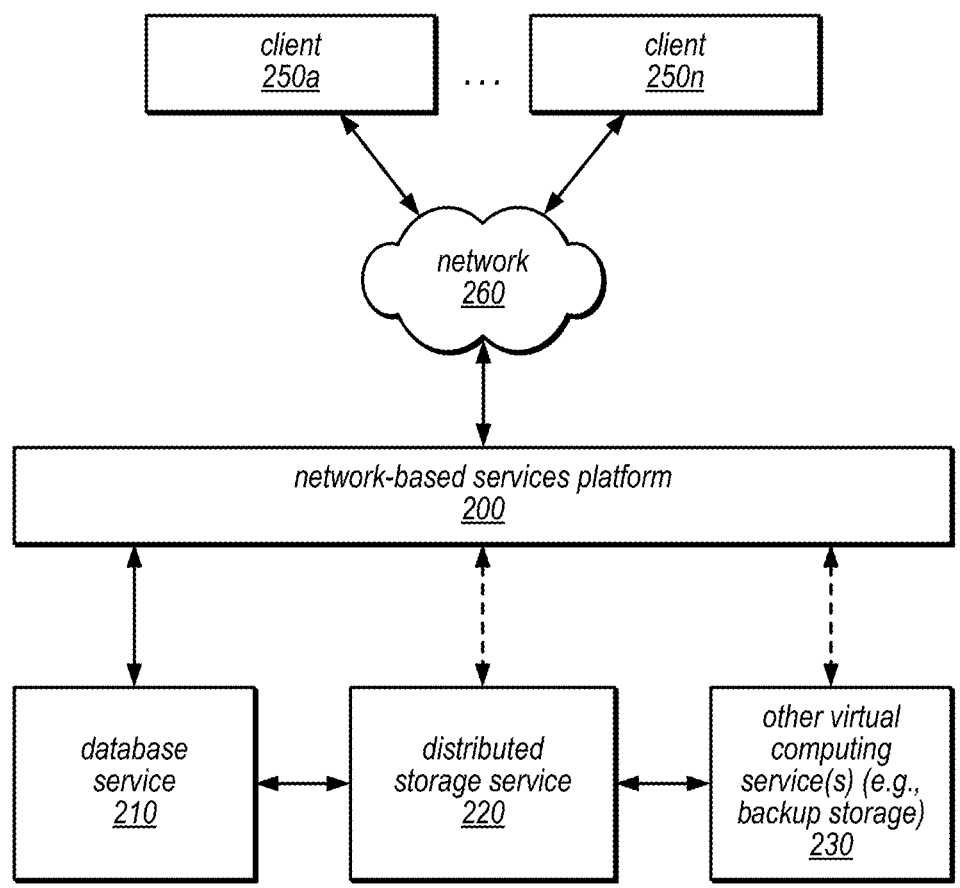
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, different nodes or system components may be distributed across multiple different data centers. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of a storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250 or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.) or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet).

In various embodiments distributed storage service 220 may be configured to interface with backup data store, system, service, or device as part of other virtual computing service(s) 230. Various data, such as data pages, log records, and/or any other data maintained by distributed storage service internal clients, such as database service 210, and/or external clients such as clients 250a through 250n, may be sent to a backup data store. Recovery operations, obtaining data from the backup storage may also be performed, such as providing archived redo log records to distributed storage service 220. This is illustrated in FIG. 2 by the solid line between other virtual computing service(s) 230 and distributed storage service 220. In some cases, the accounting and/or credentialing services of platform 200 may be unnecessary for internal clients such as administrative clients or between service components within the same enterprise.

Note that in various embodiments, different storage policies (or data retention policies) may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
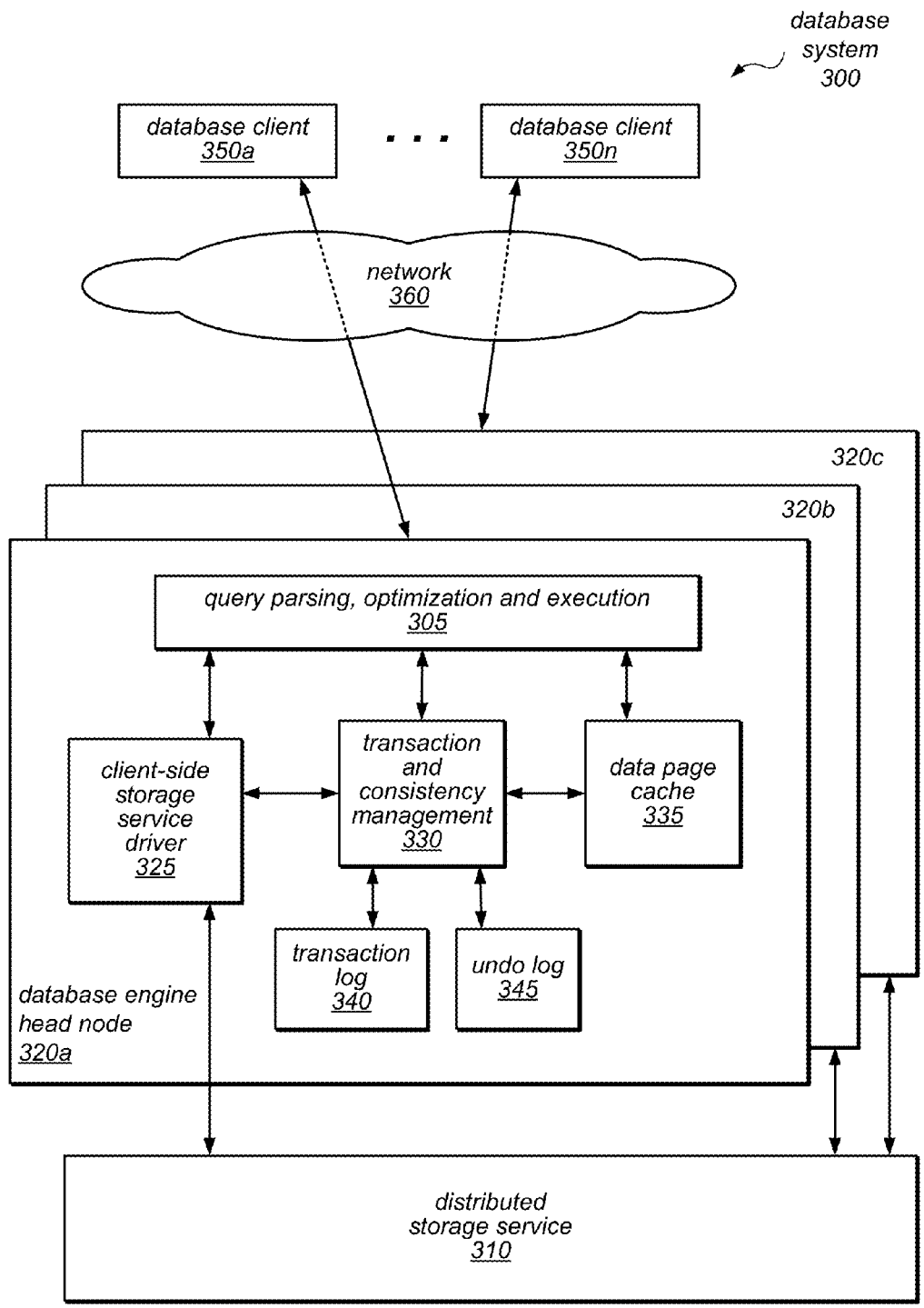
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage service, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group (sometimes referred to as a quorum set). In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
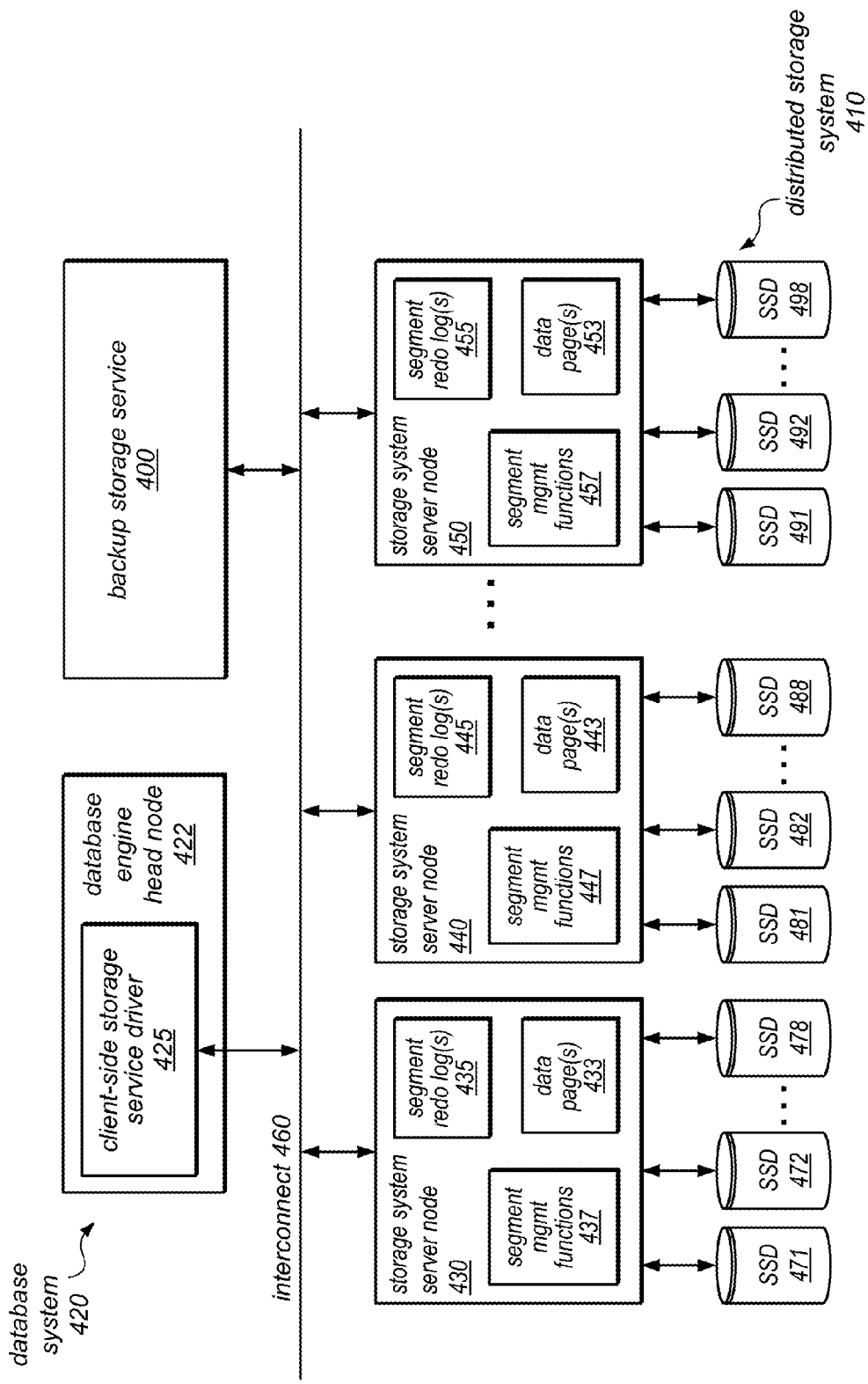
FIG. 4 is a block diagram illustrating a distributed storage system, according to some embodiments.

One embodiment of a distributed storage system is illustrated by the block diagram in FIG. 4. Although discussed in the context of the interacting with database system 420, distributed storage system 410 may more broadly illustrate the various components of a distributed storage system implementing log-structured storage. Thus storage system server nodes 430, 440, through 450 may each implement variable data replication for log-structured storage implementing data backup as discussed in further detail below with regard to FIGS. 5B, 5C, 7 and 9-11. In some embodiments, storage nodes 430-450 may perform reclamation at the same or near the same time (i.e., synchronously), or independently (asynchronously) from one another. A centralized authority, such as volume manager (which may be another node or instance implemented for the distribute storage system 410, such as on one or more computing devices, such as computer system 1200 described below with regard to FIG. 12) or other module, may determine a log reclamation point (which may indicate which log records may be durably-backed in backup storage service 460) for the storage nodes 430-450 according to the various methods and techniques discussed below with regard to FIG. 12, and broadcast the log reclamation point to the storage nodes upon a change, increment or other modification of the log reclamation point, in various embodiments. For example, volume manager 480 may direct, detect, and/or determine the archival of log records and/or other data maintained by distributed storage system 410 to backup storage service 400 (e.g., a remote key-value durable backup storage system), and determine a log reclamation point such that data blocks containing log records that are currently archived may be reclaimed. Volume manager may then send a Garbage Collection LSN (GCL) to indicate the log reclamation point to storage nodes 430-450. Volume manager may also implement various other techniques, such as those described below with regard to FIG. 7 in order to determine a reclamation point for the log page reclamation point. In some embodiments, storage nodes 430-450 may also determine the log reclamation point, such as by requesting the log reclamation point from volume manager, or querying other storage nodes to reach a consensus on log records that may be garbage collected.

In at least some embodiments, storage nodes 430-450 may store data for different clients as part of a multi-tenant storage service. For example, the various segments discussed above and below with regard to FIG. 8, may correspond to different protection groups and volumes for different clients. As noted above, some storage nodes may perform reclamation independent from other storage nodes, and upon portions of a log maintained for a particular client. Consider the scenario where a storage node maintains data for two different clients. One client's data may be actively accessed/modified, causing the log structure for that data to grow quickly. Log records for the one client's data that become durably-backed in a backup data store may be reclaimed at a different time than log records maintained for the other client. In some embodiments, a storage node may be maintaining a complete view of the data for one particular client, while maintaining an incomplete view of the data for a different client.

In some embodiments, a database system 420 may be a client of distributed storage system 410, which communicates with a database engine head node 422 over interconnect 460. As in the example illustrated in FIG. 3, database engine head node 422 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., reclamation of space). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block-based storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node 422, e.g., to receive redo logs, send back data pages, and backup storage service 400, to backup or retrieve log records from an archived version of a log.

Figure 5A:
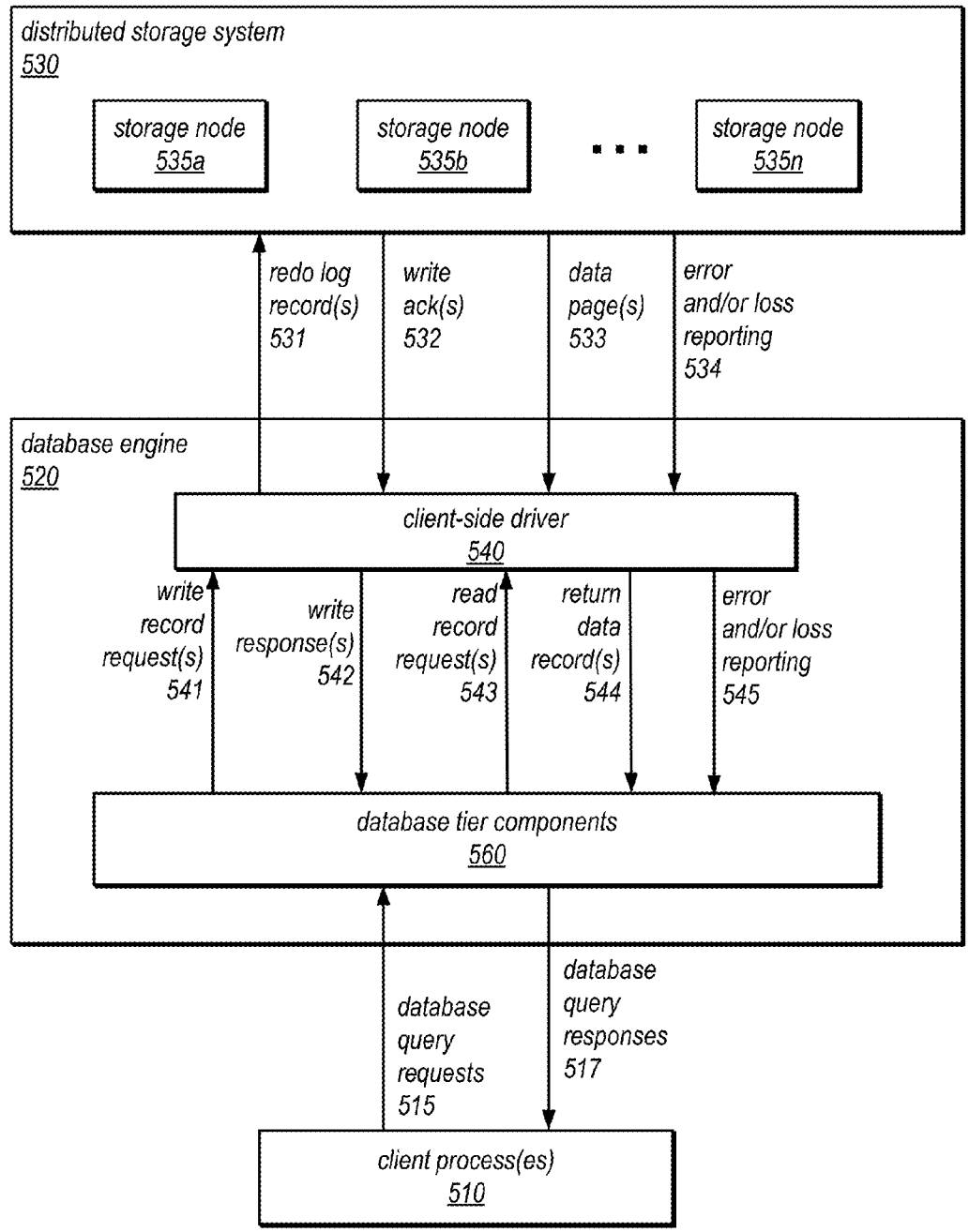
FIGS. 5A through 5C are block diagrams illustrating the use of a separate distributed storage system and data backup system for data stored for a database system, according to some embodiments.

FIG. 5A is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5A, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). In at least some embodiments, the requested data pages may be serviced from a data page entry in a backstop data structure maintained at a storage node 535 that maintains the data. Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5A, distributed storage system 530 may store data blocks on storage nodes 535a-535n, each of which may have multiple attached SSDs. In some embodiments, distributed storage system 530 may provide high durability for stored data block through the application of various types of redundancy schemes.

Figure 5B:
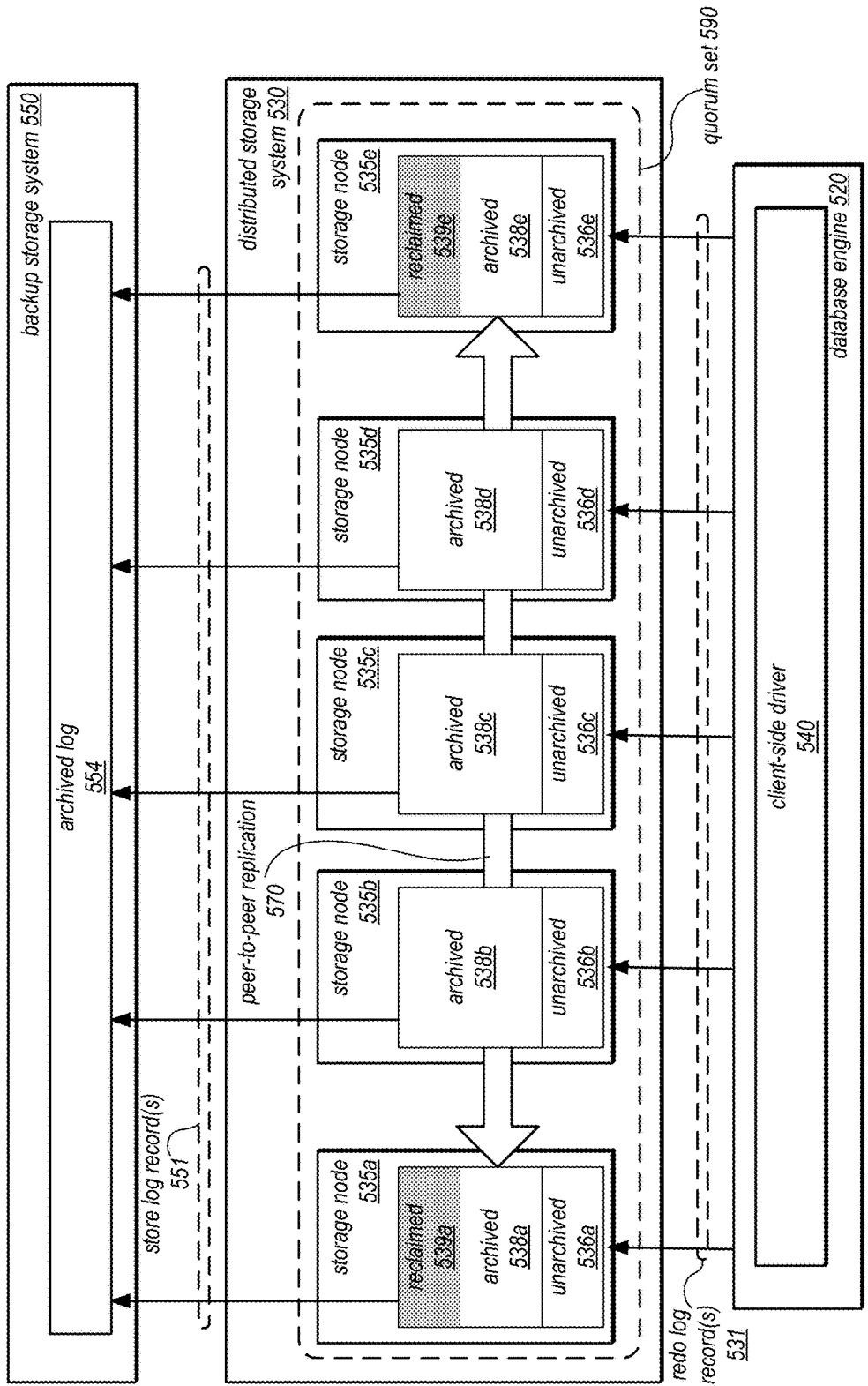

FIG. 5B illustrates interactions among storage nodes in a protection group implementing variable replication for distributed storage, a database system and a backup storage system according to some embodiments. As discussed above, redo log record(s) 531 may be sent to different storage nodes in distributed storage system 530. In at least some embodiments, different redo log records may be sent to storage nodes 535 that implement a quorum set 590 for a portion of the database volume. Quorum set 590, for example, is illustrated in FIG. 5B as composed of group members, storage node 535a, storage node 535b, storage node 535c, storage node 535d, and storage node 535e. Different storage nodes may receive different log records, and may still be durably maintained in satisfaction of a protection group policy, such as a write quorum requirement. For example, if a write quorum requirement is 3/5 storage nodes, redo log record A may be sent and acknowledged at storage nodes 535a, 535b, and 535c, while redo log record B may be sent and acknowledged at storage nodes, 535c, 535d, and 535e. Thus, storage nodes 535a and 535b maintain a different log record A than storage nodes 535d and 535e, and vice versa with respect to log record B. As discussed below with regard to FIG. 7 redo log records 531 sent to a storage node may be initially stored in an unarchived portion (which may be stored out of order), such as unarchived portions 536a, 536b, 536c, 536d, and 536e respectively of block-based storage devices accessible to storage nodes 535a, 535b, 535c, 535d, and 535e. These log records may then be moved to an archived portion (which may store log records sequentially according to an LSN for each log record), such as archived portions 538a, 538b, 538c, 538d, and 538e respectively.

In at least some embodiments, a peer-to-peer synchronization or replication technique 570 may be implemented to ensure that storage nodes of quorum set 590 may catch up to the same or similar version of data. The log records stored in the archived portion may be evaluated to determine a completion point for log records maintained at a particular storage node. A completion point may be the point in the log record sequence for which the log records are maintained at the storage node have no holes or gaps for missing log records. As the archived portion may store log records in data blocks according to the log record sequence, the first gap or missing log record may be easily identified, such as at the end of a respective data block storing log records. Indexing structures for the archived portion may be maintained, which may be searched to determine the completion point. Based, on the sequence completion points, storage nodes, such as storage node 535a, may identify another storage node that is further advanced in the log record sequence, such as 535b, and request log records from 535b to complete the log record sequence at 535 up to the sequence completion point at 535b. This replication process may be performed amongst the storage nodes of protection group 590, in the background, while still processing and responding to the various requests illustrated in FIG. 5A. The peer-to-peer replication technique 570 may also be used to catch up new or additional storage nodes added to quorum set 590 (e.g., as may be added to replace a failed/unavailable storage node) with subsequent write requests that are currently unarchived. In various embodiments, the log records that are received from other storage nodes may be directly stored to the archived portion of the block-based storage device, by-passing the archived portion altogether (as illustrated at 570). However, in other embodiments, log records may be sent to other storage nodes and first placed in the unarchived portion. Log records maintained in the archived portion may be sent asynchronously from storage nodes 535 to be stored 551 in archived log 554 in backup storage system 550.

Figure 1B:
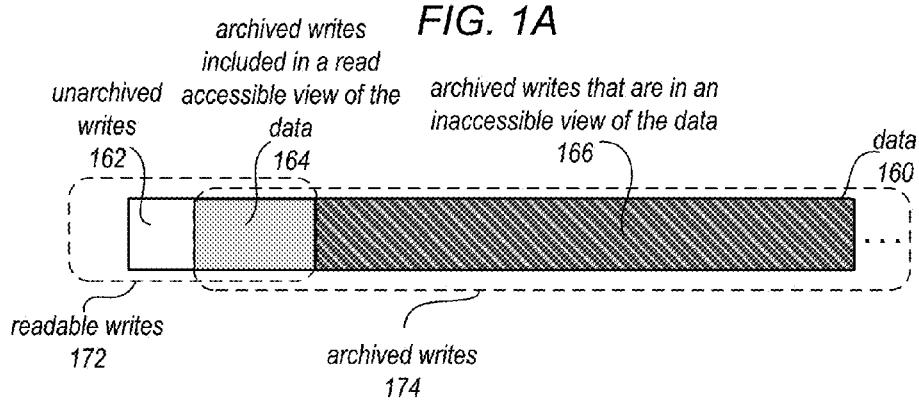

In at least some embodiments, some storage nodes may be designated as storage nodes maintaining an incomplete view of the data (as illustrated in FIG. 1). Storage nodes 535 maintaining an incomplete view of the data may be configured to determine whether log records stored in their respective archived portion 538 are backed up in archived log 554. If the log records are determined to be backed up, the storage nodes 535 may reclaim the storage space from the a portion for storing other data (which may be data for a different storage client, in some embodiments). For example, in FIG. 5B storage nodes 535a and 535e are illustrated as maintaining incomplete views of the data (sometimes referred to as incomplete storage nodes). Each of these storage nodes may determine which log records maintained in the archived portion are backed up in archive log 554, reclaim the respective storage space, as illustrated by reclaimed portions 539a and 539e. In some embodiments, a volume manager or other control plane function for distributed storage system 530 (such as discussed above with regard to FIG. 4) may direct or determine which log records may be reclaimed, such as by sending out a reclamation point in the log sequence for which log records prior to the reclamation point in the log sequence may be reclaimed.

Figure 5C:
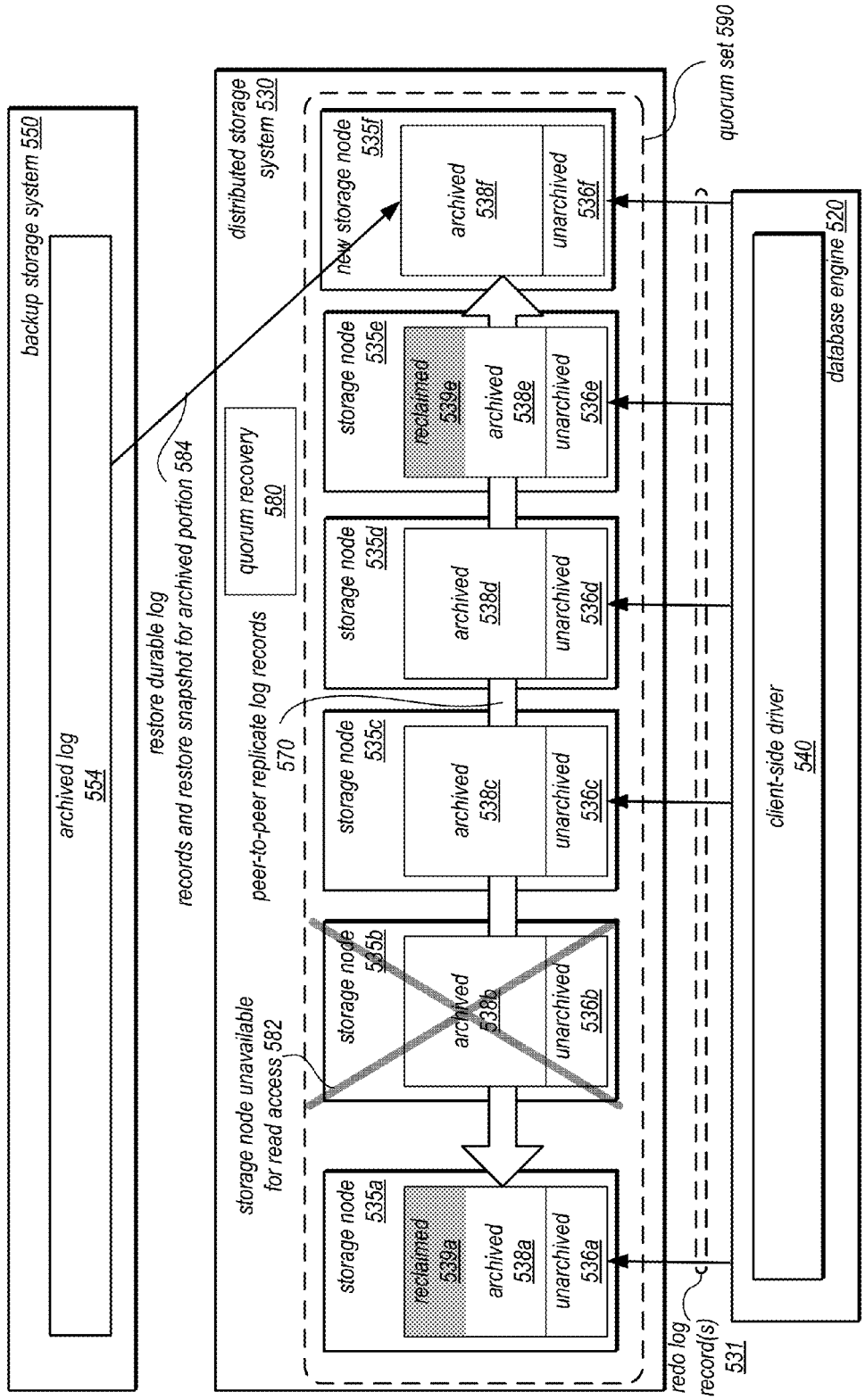
Figure 11:
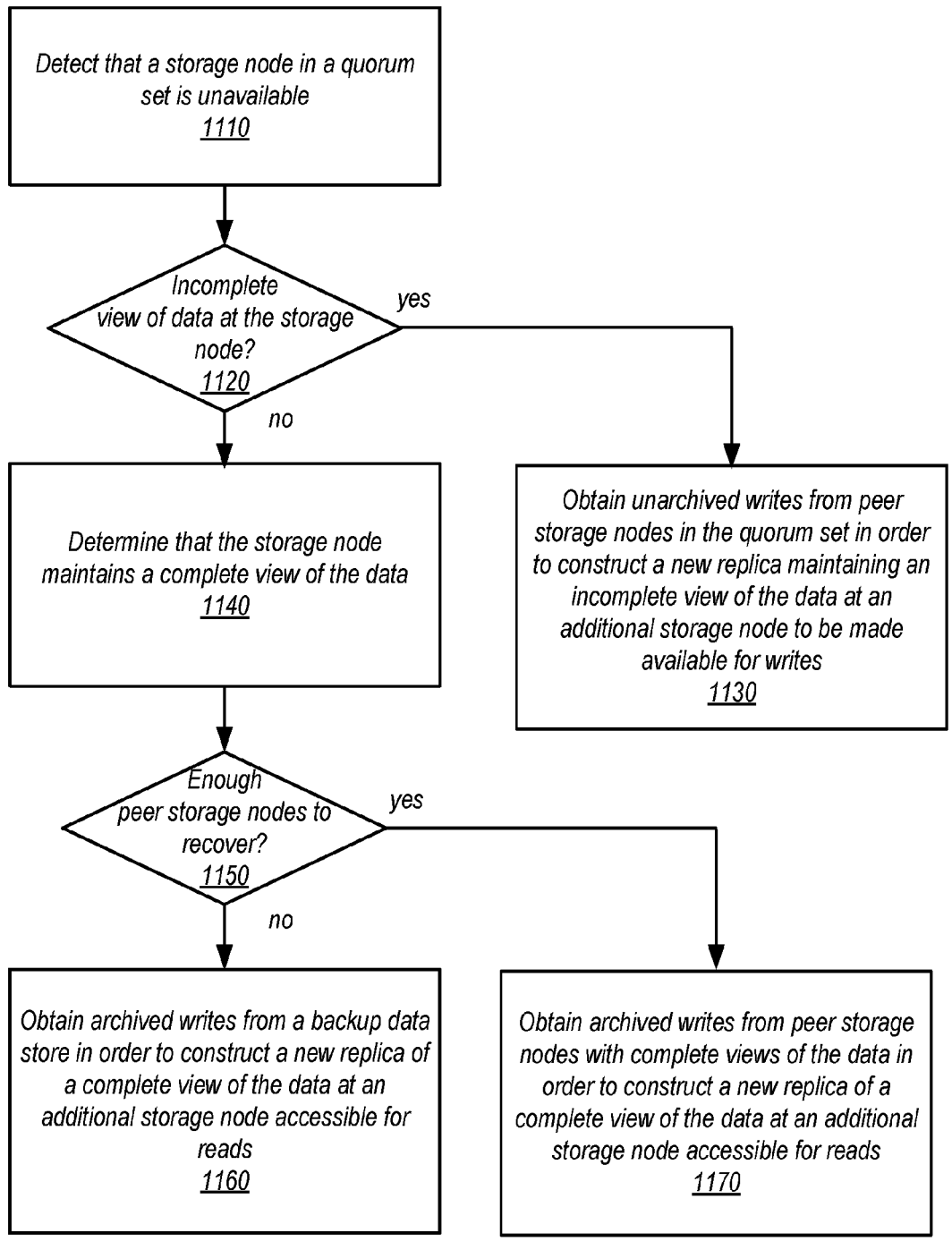
FIG. 11 is a high-level flowchart illustrating methods and techniques for recovering a storage node in a quorum set, according to some embodiments.

FIG. 5C illustrates a recovery operations for storage nodes in a quorum set, according to some embodiments. For example, a storage node in quorum set 590, storage node 535b, may become unavailable 582 for read access (e.g., due to system failure). One or more other storage nodes 535 may detect storage node 535b's failure (e.g., via no responses to peer-to-peer messages) and report the unavailable node to a control plane, such as quorum recovery module 580 (which may be implemented as distributed storage system 530 component or node responsible for ensuring that quorum sets include enough healthy nodes to satisfy protection group requirements for reads and/or writes). In some embodiments, quorum recovery module 580 may detect the unavailability of storage node 535b through the use of various heartbeat or other health polling techniques for storage nodes 535. Quorum recovery module 580 may provision, direct, obtain or otherwise include a new storage node 535f to be a part of quorum set 590. This storage node may be available to begin receiving redo log records 531 and placing them in a respective unarchived portion 536f. Log records that are supposed to be still available for reads, which may only currently exist (in the distributed storage system 530) at storage nodes 535c and 535d in archived portions 538c and 538d, may be obtained and stored in archived portion 538f as part of a recovery operation. In some embodiments, quorum recovery module 580 may request backup storage system 550 to send specific log records from archived log 554 to restore 584 the log records to new storage node 535f. In some embodiments, a restoration snapshot or set of data upon which the log records in archived portion 538f may depend to realize a complete view of the data may also be sent and stored in archived portion 538f. As noted above, peer-to-peer replication may provide unarchived log records to be stored in unarchived portion 536f that were received at other storage nodes 535. In some embodiments, a sufficient number of peer storage nodes may be available that the log records may be recovered from other peer storage nodes in quorum set. FIG. 11, discussed below, provides examples of various methods and techniques for recovering or restoring log records to reconstruct a new complete view of the data on a new storage node for read requests which may be implemented by distributed storage system 530, in some embodiments.

Note that in various embodiments, the API calls and responses between database engine 520 and distributed storage system 530 (e.g., APIs 531-534), the API calls and responses between client-side driver 540 and database tier components 560 (e.g., APIs 541-545), the API calls between distributed storage system components (e.g., 570), the API calls between distributed storage system 530 and backup storage system 550 (e.g., 551 and 584) and in FIGS. 5A-5C may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520, distributed storage system 530 and/or backup storage system 550.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
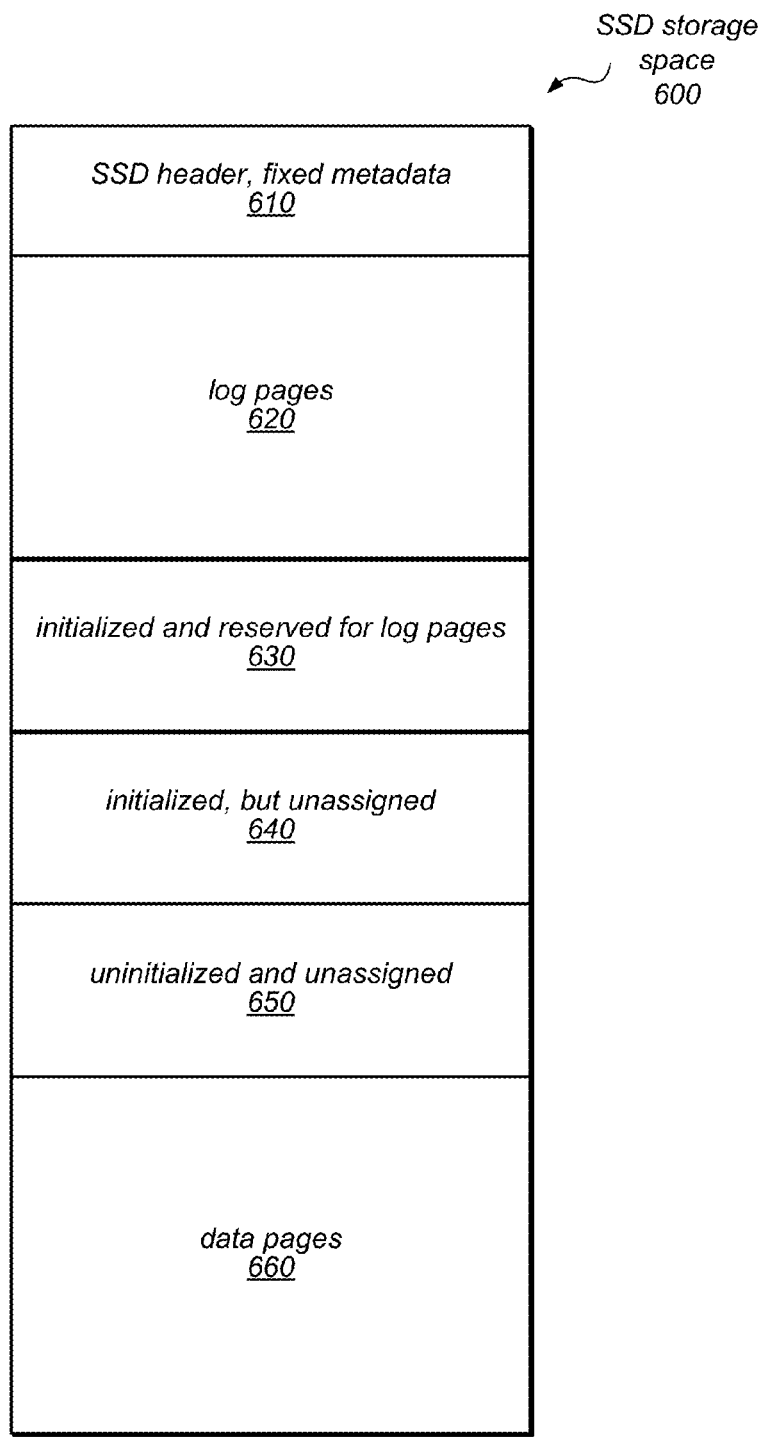
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages. A base page storage portion may be a fixed or assigned portion of SSD storage space 600 that maintains a respective entry for each user page, in some embodiments.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot and the last reserved log page slot. In some embodiments, this pool may safely grow up to last usable log page slot without re-initialization of new log page slots (e.g., by persisting an update to the pointer that identifies the last reserved log page slot). In this example, beyond the last usable log page slot, the pool may grow up to the first used data page slot by persisting initialized log page slots and persistently updating the pointer for the last usable log page slot. In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot.

In the example illustrated in FIG. 6, the current data page slot pool includes the area between the last usable log page slot and the end of SSD storage space 600. In some embodiments, the data page pool may be safely grown to the position identified by the pointer to the last reserved log page slot by persisting an update to the pointer to the last usable log page slot. In this example, the previously initialized, but unassigned portion of the SSD storage space 600 shown as 640 may be pressed into service to store data pages. Beyond this, the pool may be safely grown to the position identified by the pointer to the last used log page slot by persisting updates to the pointers for the last reserved log page slot and the last usable log page slot, effectively reassigning the portions of SSD storage space 600 shown as 630 and 640 to store data pages, rather than log pages. In some embodiments, the data page slot pool may be safely shrunk down to the position identified by the pointer to the first used data page slot by initializing additional log page slots and persisting an update to the pointer to the last usable log page slot.

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of different parts (or zones): one that contains a hot log, one that contains a cold log, one that contains user page data, and a base page portion that includes an entry corresponding to an oldest or historical version of each user data page. Zones are not necessarily contiguous regions of an SSD. Rather, they can be interspersed at the granularity of the storage page (or a data block). In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, access control metadata, and/or base page storage metadata or location information.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful. Thus, VSL CLRs may, in some embodiments, be marked as garbage collectible in the hot log, and not moved to cold log storage.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, base page storage may store the current or historical versions of user data pages in entries corresponding to user data pages. For example, a user page table, or other index, may include pointers, links, addresses, or some other form of mapping information or identifiers that lead to entries corresponding to particular user data pages. In some embodiments, individual entries may vary, with some entries comprising one or more data blocks or pages, while others comprise less than a block or page. Alternatively, in some other embodiments each entry corresponding to a user page may be a fixed, same size, such as 1 page. The data stored in entries may be compressed and/or encrypted according to user and/or system preference.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

Figure 7:
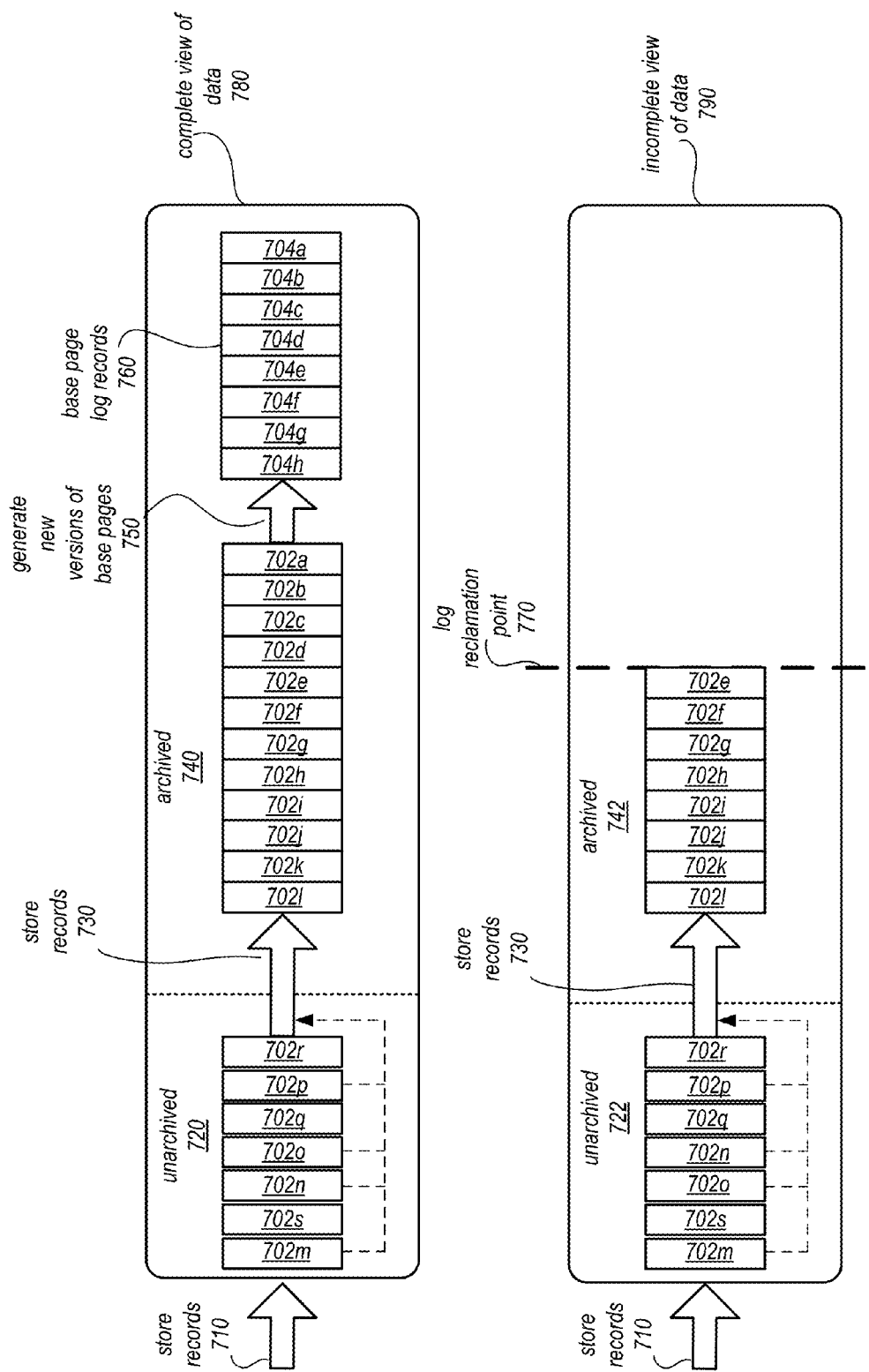
FIG. 7 is a block diagram illustrating a complete view of data and an incomplete view of data in a distributed storage system that is log-structured, according to some embodiments

FIG. 7 is a block diagram illustrating a complete view of the data and an incomplete view of the data at storage nodes in a distributed system implementing log-structured storage, according to some embodiments. As noted above, log records received at a storage node may be stored 710 in a log of data. Different storage nodes may maintain different versions of the log of the data, such as a complete portion of the log which provides a complete view of the data 780 or an incomplete portion of the log which provides an incomplete view of the data 790. Log records may be received out of order, appended to the unarchived portions 720 and 722 as they are received. For example, in complete view of the data 780, the ordering of log records stored in unarchived portion 720 proceeds from record 702*r*, then 702*p*, 702*q*, 702*o*, 702*n*, 702*s*, and finally 702*m*. While, in unarchived portion 722, the ordering of log records proceeds from record 702*r*, then 702*p*, 702*q*, 702*n*, 702*o*, 702*s*, and 702*m*. Both of these respective orderings may be contrary to a sequential ordering which might start with 702*m* and end with 702*s*. Log records sent to a distributed storage system, such as described above in FIG. 5A, may be sent asynchronously, leading to log records received out of order at unarchived portions 720 and 722, in some embodiments.

Log records may be moved from the unarchived portion to be stored 730 in the archived portion. Moving log records from the unarchived to the archived portion may occur differently at different storage nodes in various embodiments. For example, moving log records from the hot log to the cold log may be performed differently for storage nodes maintaining a complete view of the data 780 than an incomplete view of the data 790 (e.g., the storage nodes maintaining the log portions may receive them at different times, or have operational capacity to perform the move at different times). In some embodiments, only log records whose LSN is less than or equal to the current unconditional volume durable LSN (VDL) or some other completion point, such as segment completion point (SCL) may be eligible to be copied to the archived portion. When moving log records from the unarchived portion to the archived portion, some log records (such as many CLRs) may not need to be copied because they are no longer necessary. In addition, some additional coalescing of user pages may be performed at this point, which may reduce the amount of copying required. For example, multiple DULRs may be coalesced to generate a single AULR. In addition to coalescing, in some embodiments log records may be compressed according to various compression techniques. For example, various different loss-less compression techniques may be performed to generate compressed versions of log records, which may be tightly packed into a data block. In some embodiments, log records stored in data blocks may be grouped together in log pages. In some embodiments, once a data block storing log records in a unarchived portion has been completely written and is no longer the newest unarchived data block, and all ULRs on the unarchived data block have been successfully copied to the archived portion, the unarchived data block may be freed, and identified as garbage collectible.

Log records, of which many various descriptions presented above, may be AULRs, DULRs, or any other type of log record for the example distributed storage system described above, or any other log-structured data store. These log records may be linked to or associated with a data page. For example, a log record may describe an update/change/modification for some portion, or all, of the data page, such as change relative to a previous record or version of the data page (e.g., a DULR). In some embodiments, log records may be stored sequentially in data blocks. Thus, the latest LSN in the ordering of log records maintained in a data block may indicate that all log records in the log page are prior to the latest LSN.

Base page log records 760 above, may contain entries or references to versions of user data pages. For example, each base page log record (704*h*, 704*g*, 704*f*, 704*d*, 704*c*, 704*b*, 704*a*) may maintain a replica or copy, or a link to, a respective user page. In some embodiments, each entry may be compressed, encrypted, or otherwise modified. New base page log records 760 may be generated according to various data retention policies. For example, instead of maintaining different log records associated with a data page prior to a particular point in time, a base page log record may be generated describing or referring to a state of a data page at the particular point in time. In some embodiments, page log records may be a restoration point or snapshot which may restored from other peer storage nodes maintaining a complete view of the data or the data backup storage.

In various embodiments, a storage node or other system maintaining an incomplete view of the data 790 may perform reclamation of storage space in archived portion 742 in response to determining that certain log records are durably stored in a backup data store (e.g., backup storage system 550 described above with regard to FIGS. 5B and 5C). This determination may be made at different times. For example, the workload of a storage node, such as the amount of foreground processing being performed (e.g., servicing write requests or read requests) may fall below a workload threshold, or some other measure, which may indicate that operational resources are available to perform log record reclamation. In some embodiments, available storage space, such as the number of pages available to store new data, such as log records, user data, or any other data, may fall below an available space threshold. A storage node may also receive an indication or instruction to perform reclamation of log pages from another system or component of the distributed storage system, such as volume manager discussed above with regard to FIG. 4.

In various embodiments, determining that log records in archived portion 742 are durably persisted, may be performed in various ways. For example, in some embodiments, a log reclamation point 770 may be implemented. A log reclamation point 770 may be determined in different ways. For example, in some embodiments log reclamation point may be a garbage collection LSN (GCL) or some other indicator that is received from another storage system component, such as volume manager in FIG. 4. The GCL may indicate that log records prior to the GCL (i.e. log records with lower LSNs) may have already been backed up to a data archive. For example, as illustrated in FIGS. 4, 5B, and 5C, a backup storage system may maintain an archived version of the log. A GCL may also be generated in response to user/client storage action, such as the creation of a snapshot of the database. A snapshot may be an indication that versions of data indicated by log records prior to the data pages may not need to be preserved at the storage node. Log reclamation point 770 may also be determined based, at least in part, on service level agreement, protocol, or some other data retention policy for preserving data. Storage nodes storing a segment may enforce the service level agreement, protocol, or schema individual, or in concert with the distributed storage system, such as via a volume manager.

In various embodiments, the evaluation of the log records in the archived portion 742 may be performed by comparing the most recent log record (e.g., 702*d*, 702*h*, 702*l*) in a particular data block with log reclamation point 770, as the log records in a data block may be sorted according to their sequence. Alternatively, in some embodiments, mapping information such as an index (such as the index described in further detail below) or other data structure may include information such as the range of log records located in a particular data block, thus archived portion 740 may be evaluated by evaluating the index structure for the archived portion 740. Data blocks that are identified as maintaining log records in the log record sequence prior to the log reclamation point may be identified for reclamation. For example, in some embodiments, the log page table or other index, listing, or metadata describing available data blocks (or pages) may be updated to include the newly reclaimed data blocks. In some embodiments, a reformat process may be applied to make the data blocks ready for new data, while in other embodiments, the data blocks may already be in the correct format to store new data.

Please note that the records and log portions as illustrated in FIG. 7 are provided for illustrative purposes only, and are not intended to be limiting. For example, log portions may contain different numbers of log records. Moreover, log portions may not be laid out in sequential order in physical storage.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

Figure 8:
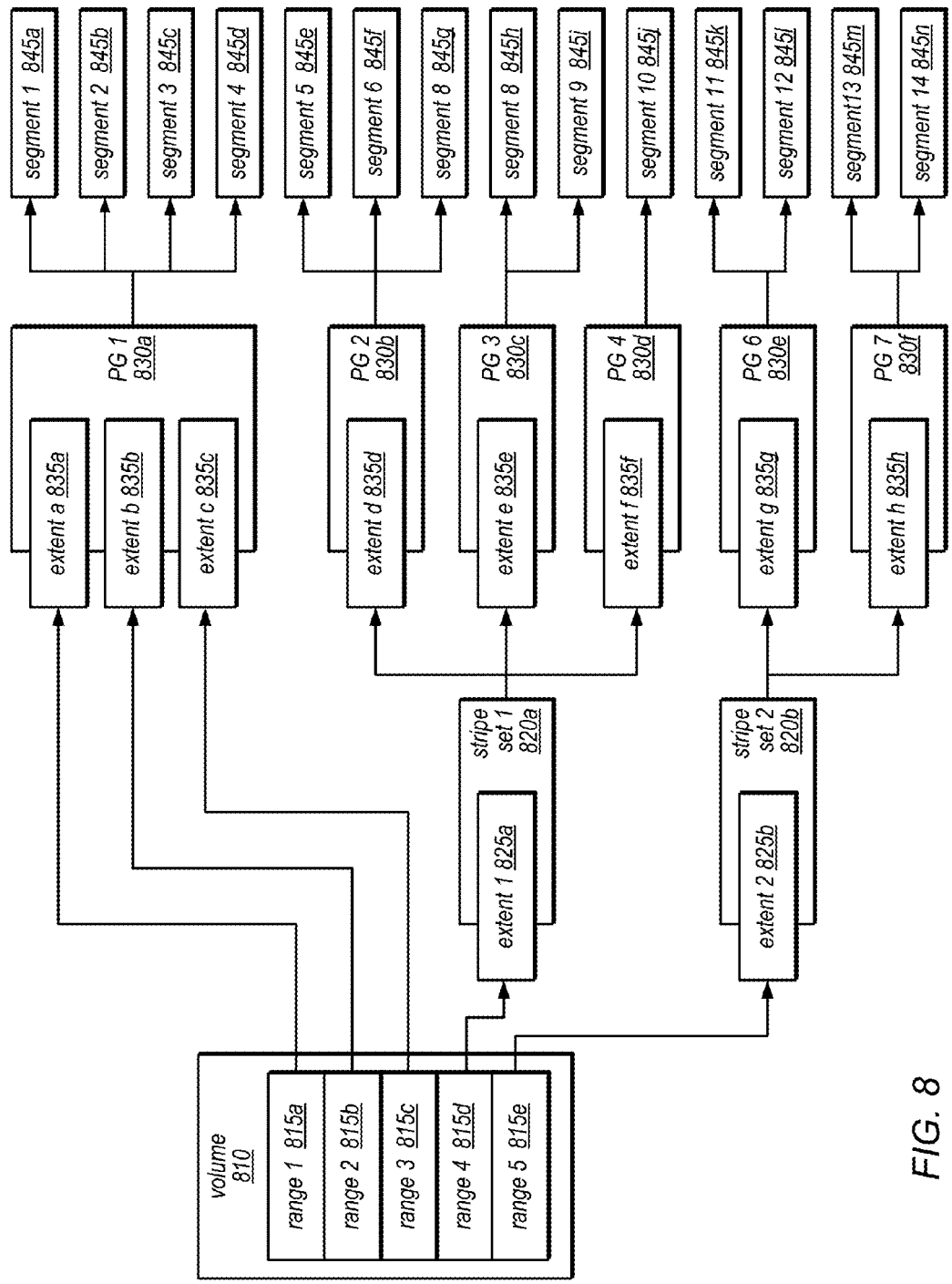
FIG. 8 is a block diagram illustrating an example configuration of a database volume, according to some embodiments.

FIG. 8 is a block diagram illustrating an example configuration of a database volume 810, according to one embodiment. In this example, data corresponding to each of various address ranges 815 (shown as address ranges 815*a*-815*e*) is stored as different segments 845 (shown as segments 845*a*-845*n*). More specifically, data corresponding to each of various address ranges 815 may be organized into different extents (shown as extents 825*a*-825*b*, and extents 835*a*-835*h*), and various ones of these extents may be included in different protection groups 830 (shown as 830*a*-830*f*), with or without striping (such as that shown as stripe set 820*a* and stripe set 820*b*). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multitier protection group that combines other protection groups (e.g., this may represent a multi-region protection group). In this example, stripe set 1 (820*a*) and stripe set 2 (820*b*) illustrates how extents (e.g., extents 825*a* and 825*b*) may be striped into a volume, in some embodiments.

More specifically, in this example, protection group 1 (830*a*) includes extents a-c (835*a*-835*c*), which include data from ranges 1-3 (815*a*-815*c*), respectively, and these extents are mapped to segments 1-4 (845*a*-845*d*). Protection group 2 (830*b*) includes extent d (835*d*), which includes data striped from range 4 (815*d*), and this extent is mapped to segments 5-7 (845*e*-845*g*). Similarly, protection group 3 (830*c*) includes extent e (835*e*), which includes data striped from range 4 (815*d*), and is mapped to segments 8-9 (845*h*-845*i*); and protection group 4 (830*d*) includes extent f (835*f*), which includes data striped from range 4 (815*d*), and is mapped to segment 10 (845*j*). In this example, protection group 6 (830*e*) includes extent g (835*g*), which includes data striped from range 5 (815*e*), and is mapped to segments 11-12 (845*k*-845*l*); and protection group 7 (830*f*) includes extent h (835*h*), which also includes data striped from range 5 (815*e*), and is mapped to segments 13-14 (845*m*-845*n*).

Figure 9:
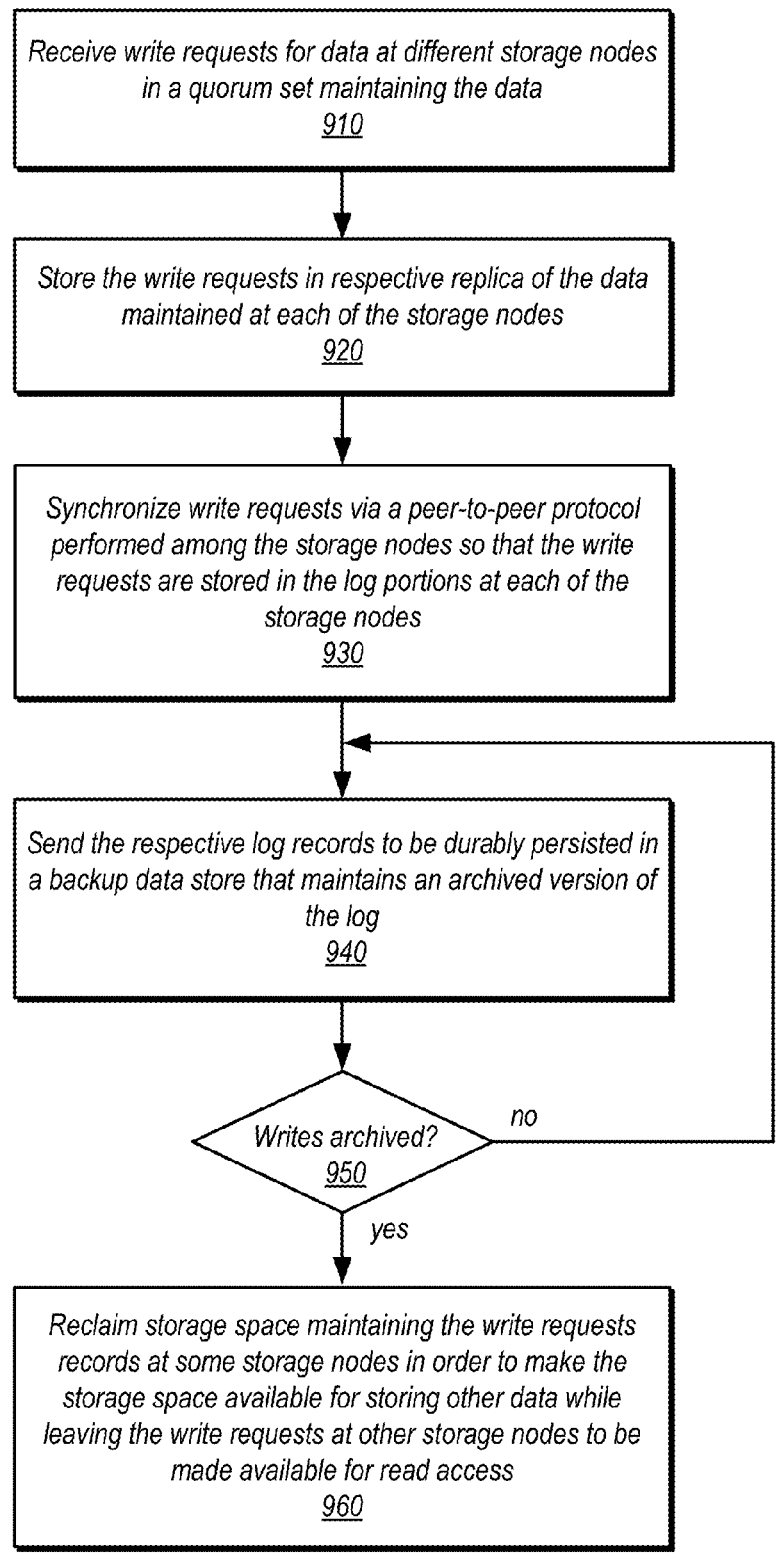
FIG. 9 is a high-level flowchart illustrating methods and techniques to implement variable data replication for storage implementing data backup, according to some embodiments.

The various embodiments of a distributed storage system described with regard to FIGS. 2-8 above, may implement one or more different techniques for variable data replication for log-structured storage implementing data backup. Variable data replication for log-structured storage implementing data backup is not limited to such systems, however. Various other kinds of storage may implement variable data replication for storage implementing data backup. For example, distributed data stores may not be organized into protection groups or quorum sets, but instead may propagate changes from one storage node implementing the optimized log storage to another in order to provide updates to multiple nodes in a distributed system. Alternatively, a single system or device (e.g., local redundant data store) implementing variable data replication for log-structured storage implementing data backup may provide a private backing store for a client system, device or application that issues asynchronous updates to a log. Moreover, although the various techniques described above were described with regard to a log-structured storage system, these techniques may be applied more generally to other types of storage systems, such as distributed storage systems. FIG. 9 is a high-level flowchart illustrating methods and techniques to implement variable data replication for distributed storage implementing data backup, according to some embodiments. Different combinations of systems and/or devices may implement the various techniques discussed below.

As indicated at 910, write requests for data maintained in a data store may be received at different storage nodes, in various embodiments. In some embodiments, the storage nodes may implement a quorum set, where each write received at the data store may have to satisfy a write quorum requirement in order for the write request to be considered durable at the data store. For example, 5 storage nodes may implement a quorum set for data. A write quorum requirement may require that at least 3/5 storage nodes acknowledge a write request as completed before the write request may be considered durable. In some embodiments, all storage nodes may be required to acknowledge a write request (e.g., 3/3 storage nodes). The write requests may be received as log records (as described above with regard to FIGS. 2-8).

However obtained, write requests may be stored in respective replicas of data maintained at each of the storage nodes, as indicated at 920, in various embodiments. For instance, if 3/5 storage nodes receive the write requests, then the write requests may be stored in the replicas of the data maintained at the 3/5 storage nodes. In various embodiments, replicas of the data may be complete views of the data or incomplete views of the data. Storage nodes maintaining incomplete views of the data may be useful for processing write requests by receiving and acknowledging write requests and storing the write requests in an unarchived portion maintained at the storage nodes. Similarly, storage nodes maintaining complete views of the data may also store the write requests in the unarchived portion maintained at the storage node. Storing write requests may, in some embodiments, include the application or performance of the write request. Whereas in some other embodiments, storing the write request may include storing some record or indication of the write request (e.g., log record) or the write request itself.

As indicated at 930, in some embodiments, write requests may be synchronized between storage nodes via a peer-to-peer protocol performed among the storage nodes of the quorum set. For instance if storage nodes A, B, and C receive write requests, storage nodes A, B, and C may then replicate the write requests to storage nodes D and E (maintaining complete or incomplete views of the data), which may have not stored them. Please note that in some embodiments synchronization may not be performed. For example, if all storage nodes are required to acknowledge a write request as complete in order for a write request to be considered durable at the data store, then each storage node may receive every write request (without any need to replicate write requests to other storage nodes). Thus, the previous examples are not intended to be limiting.

Over time, as more log records are received at the storage nodes, a backup operation for the data may be performed. Write requests may be sent to a backup data store which may preserve the write requests in a separate or remote durable storage, such as a data archive. Thus, at some time, the respective write requests may be sent to the backup data store to be durably persisted as part of an archived version of the data, as indicated at 940. Write requests may be sent to the backup data store asynchronously. The archived version of the data may include all write requests that are durably-backed and still maintained to be restorable for reads (as illustrated in FIG. 1B) as well as other write requests indicating historical states of the data over time. In some embodiments, a portion of the archived log may only retain write requests for specific points in time (e.g., snapshot points in time). Write requests that fall between the specific points in time may be reclaimed in the archived version.

For storage nodes maintaining an incomplete view of the data, a determination may be made as to whether the respective write requests are archived, and thus stored in the backup data store, as indicated at 950. For instance, in various embodiments, a control plane function or data manager may track which write requests have been sent to a backup data store. The control plane function or data manager may then indicate to storage nodes maintaining incomplete views of the data which write requests are stored in the backup data store. In some embodiments implemented log-structured storage, this indication may be a particular sequence number, such as an LSN, which may indicate to the storage nodes that all log records with LSNs prior to the particular LSN may be stored in the backup data store. If write requests are not determined to be durably persisted in the backup data store, the write requests may be sent again (as indicated by the negative exit from 950) or further time may be allowed to elapse (as the backup operation may have not yet stored the write requests) prior to again determining whether or not they have been durably persisted in the backup data store.

For write requests that are determined to be archived and durably persisted in the backup data store, as indicated by the positive exit from 950, then storage space for the durably-backed write requests may be reclaimed at some storage nodes (e.g., hot log tail portion storage nodes) in order to make space available at the storage nodes for storing other data, as indicated at 960. In some embodiments, storage nodes may be implemented as multi-tenant storage nodes (which may store different data/log portions for different storage clients at the same storage node). Thus, the reclaimed storage space may be used to store write requests for other data maintained for another storage client. In at least some embodiments, a storage node may maintain a complete view of the data for one for a particular storage client, and may maintain an incomplete view of the data for another storage client. Storage space may be reclaimed in different ways. Data blocks storing the write requests (or data pages or data blocks modified by the write requests) may be marked or otherwise identified as available (e.g., in a mapping or index structure). The write requests may be deleted, and the storage space reformatted, in some embodiments.

Write requests necessary to service a read request may not necessarily be stored in storage nodes maintaining incomplete views of the data. Storage nodes maintaining complete views of the data may, in various embodiments, process read requests for data (e.g., for data at a specific point in time). The number of storage nodes maintaining complete views of the data may be based, at least in part, on the number of storage nodes sufficient to service read requests at some service level or performance guarantee. While recovery of write requests maintained in the backup data store may be performed (as discussed below with regard to FIG. 11), write requests in the backup data store may not be quickly or easily accessible for reads with the performance of a restoration operation. Therefore, the number of storage nodes maintaining complete views of the data may not necessarily consider write requests stored in a backup data store as available for servicing read requests (even though they may be restored for servicing read requests). However, in some embodiments, read requests for data that may be serviced by write requests in an incomplete view of the data may also be serviced at a storage node only maintaining an incomplete view of the data, in some embodiments. Therefore, a determination of which storage node(s) may service a particular read request may be performed. For example, a storage client, such as client-side driver 540 in database engine 520 in FIGS. 5A-5C, may track where particular requests or log records are sent, and may be able to determine whether a storage node with an incomplete view of the data may be able to service a particular read request. Alternatively, in some embodiments, the data store may receive the read request and make a similar determination based on tracking information about write requests that it may maintain.

Figure 10:
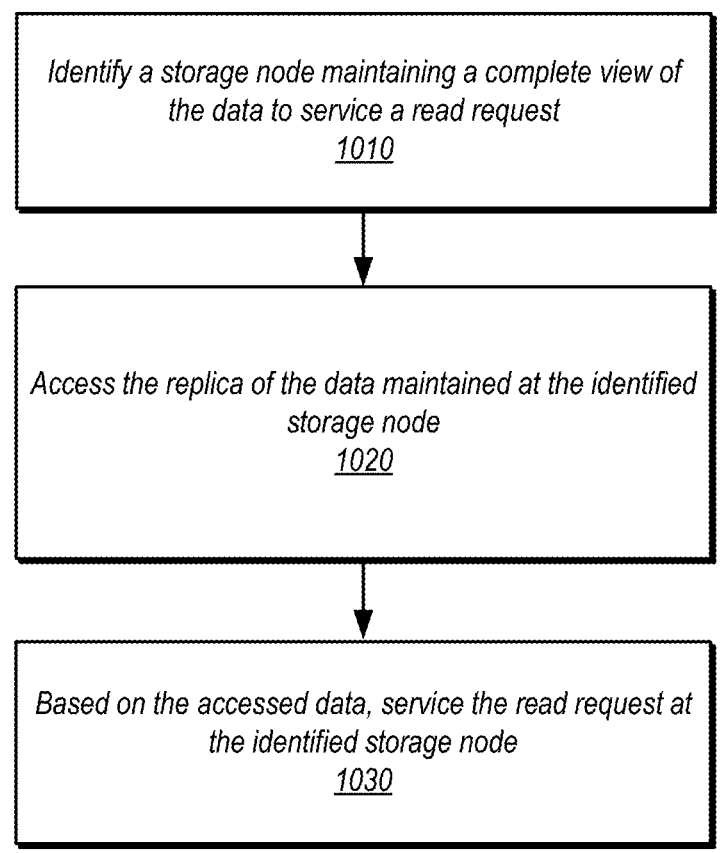
FIG. 10 is a high-level flowchart illustrating methods and techniques to process read requests at storage nodes maintaining a complete view of data, according to some embodiments.

While, in some embodiments, read requests may be serviced at storage nodes maintaining incomplete views of data, many read requests may only be serviced at storage nodes maintaining complete views of the data (as the write requests necessary to service the request may only be maintained in the complete view of the data). FIG. 10 is a high-level flowchart illustrating methods and techniques to process read requests at storage nodes maintaining complete views of the data, according to some embodiments. As indicated at 1010, a storage node maintaining a complete view of the data may be identified, in some embodiments. For instance, in some embodiments, storage clients may be responsible for directing requests, such as read requests, to particular storage nodes. The storage client may be able identify a storage node maintaining a complete view of the data based on mapping information (which may indicate which storage nodes are maintaining incomplete views of the data and which storage nodes are maintaining complete views of the data). This mapping information may be provided to a storage client from a data store.

In some embodiments, a data store itself may receive read requests and identify a storage node maintaining a complete view of the data to service the read request. For example, if the data store is implemented as locally redundant storage system (where storage nodes may correspond to particular storage devices which may be implemented in the same physical storage system), then a component of the data store may be configured to identify and route requests (e.g., read or write) to particular storage nodes in the storage system.

As indicated at 1020, in the replica of the data at the identified storage node may be accessed. For example, the read request may indicate a portion of data to be read at specific point in time. In log-structured storage, log records useful to reconstruct the portion of data the specific point in time may thus be accessed. Based on the accessed data, the read request may then be serviced at the identified storage node, as indicated at 1030. For instance, the accessed log records in log-structured storage may be replayed to generate a version of the portion of data at the specified time. The read portion of data may then be sent to a storage client or other requestor of the portion of data.

As only the number of storage nodes maintaining a complete log tail portion available for servicing read requests may reduce the number of storage nodes available to service read requests, in various embodiments, recovery or restoration actions may quickly pursued when one or more of the storage nodes maintaining complete log tail portion becomes unavailable (e.g., as illustrated above in FIG. 5C). FIG. 11 is a high-level flowchart illustrating methods and techniques for recovering a log tail portion at a storage node, according to some embodiments.

As indicated at 1110, storage node in a quorum set that is unavailable may be detected. For example, other components, such as in a control plane for the storage nodes, or other storage nodes themselves may send heartbeat or other heath/status communications to the storage nodes in a quorum set. A failure to respond, or some other indication or trigger sent in response, may indicate that a particular storage node is unavailable. If the storage node maintains an incomplete view of the data, as indicated by the positive exit from 1120, then unarchived writes from peer storage nodes in the quorum set may be obtained to construct a new replica of the data maintaining an incomplete view of the data at a new storage node to be included in the quorum set, as indicated at 1130. This storage node may be available to process write requests, in various embodiments.

If the storage node is not maintaining an incomplete view of the data, as indicated by the negative exit from 1120, then it may be determined that a storage node maintaining a complete view of the data is unavailable to service read requests, in various embodiments, as indicated at 1140. In response to detecting that the storage node is unavailable, a determination may be made as to whether a recovery operation should be performed to replace or account for the unavailable storage node, in some embodiments, as indicated at 1150. As discussed above, a number of complete views of data maintained at storage nodes may be determined based on the service performance agreement or level that is to be maintained for servicing read requests. If, for example, 3 complete views of data are needed to provide a particular service level for servicing read requests, and 3 complete views of data are still available (e.g., 4 complete views may normally be maintained), then the recovery operation may not performed (or may not be designated as a high-priority recovery operation). In some embodiments, other considerations may also be taken into account when determining whether (or when) to perform a recovery operation. For instance, if a quorum model requires a particular number of available storage nodes to perform other operations (e.g., service write requests), then a recovery operation may still be performed (e.g., even if the complete view may not be needed to maintain a service level for servicing read requests).

As indicated at 1150, a determination may be made as to whether enough available peer storage nodes maintaining a complete view of the data are available to perform the recovery operation, in some embodiments. A number of peer storage nodes that may be required to perform a peer-based recovery operation to construct a new replica of the complete view of the data at a new storage node. For example, if a particular recovery technique (e.g., based on recovering log records by from a read quorum of storage nodes) requires a minimum number of peer storage nodes in a quorum set to reconstruct a complete view of the data, then the determination may be based on whether the number of available peer storage nodes exceeds the minimum number of peer storage nodes to perform the recovery technique. In another example, if the number of peer storage nodes exceeds some durability or replication requirement for complete views of the data (e.g., if only 1 remaining storage node maintains a complete view of the data, then as a single point of failure, recovery may be better performed from a backup data store). If enough peer storage nodes are available, as indicated by the positive exit from 1150, then the peer-based recovery technique may be performed. Write requests may be obtained from peer storage nodes with complete views of the data in order to construct a new replica of the complete view of the data at a new storage node to be made available for read access, as indicated at 1160. Peer storage nodes may also provide a restoration point or snapshot of data upon which the write requests depend in order to complete the view of the data. Peer storage nodes may also send unarchived write requests, in some embodiments.

In some embodiments, if enough peer storage nodes are not available, as indicated by the negative exit from 1150, then write requests (or corresponding data) in the backup data store may be obtained to construct a new complete view of the data at an additional storage node to be made available for reads, as indicated at 1170. For instance, a request for the write requests (or data) may be sent to the backup data store, from a recovery service or control plane component (e.g., recovery module 580 in FIG. 5C) indicating the particular write requests or data that are according to data retention policies still designated as readable at the data store. These write requests may then be received at a replacement storage node to be stored as part of a new replica of a complete view of the data.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 12:
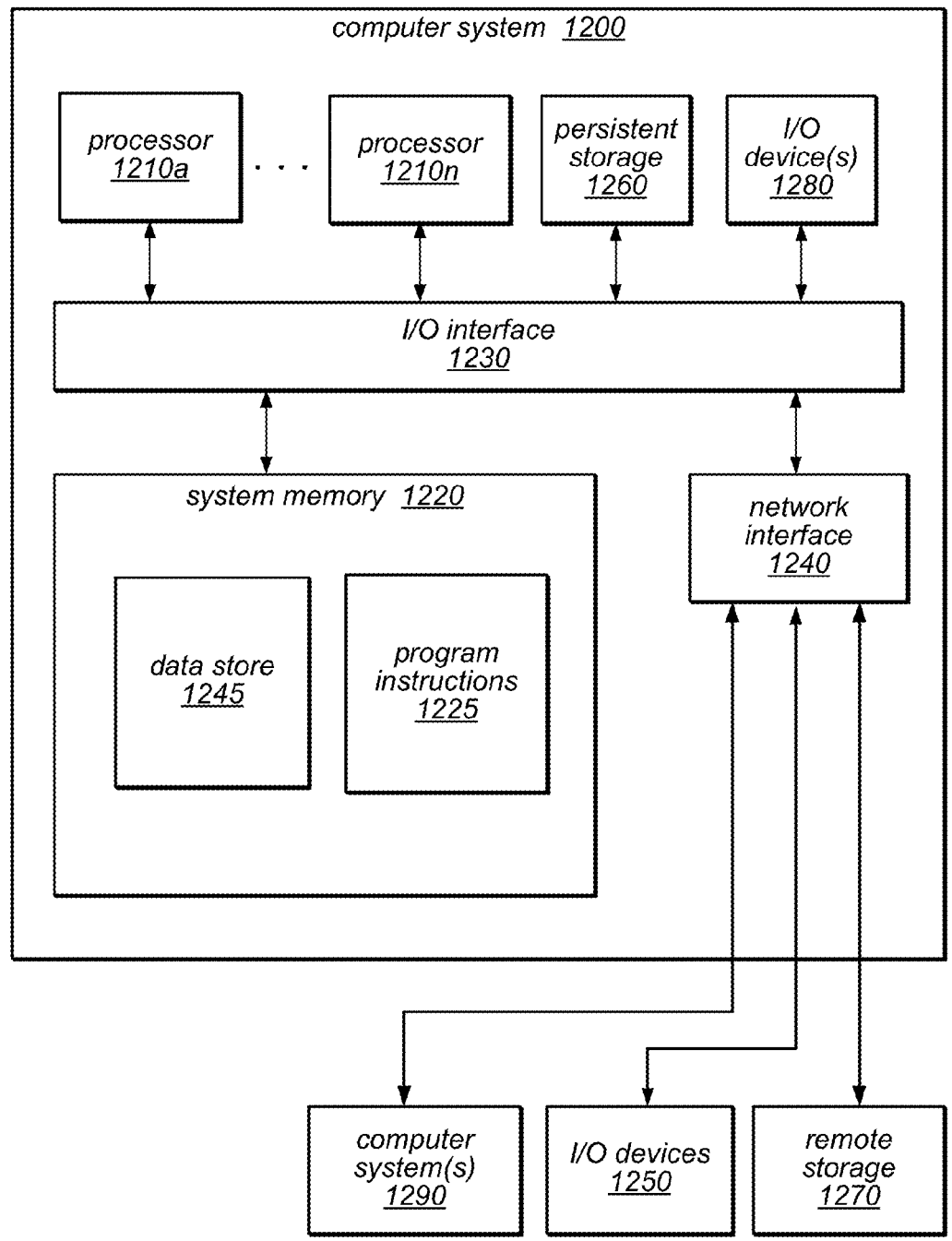
FIG. 12 is an example computer system, according to various embodiments.

FIG. 12 is a block diagram illustrating a computer system configured to implement at least a portion of the storage systems, database systems, backup storage systems, or other systems or devices described herein, according to various embodiments. For example, computer system 1200 may be configured to implement a database engine head node of a database tier, or one of a plurality of storage nodes of a separate distributed storage system that stores databases and associated metadata on behalf of clients of the database tier, in different embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.). For example, a client application executing on system 1200 may use network interface 1240 to communicate with a server application executing on a single server or on a cluster of servers that implement one or more of the components of the database or storage systems described herein. In another example, an instance of a server application executing on computer system 1200 may use network interface 1240 to communicate with other instances of the server application (or another server application) that may be implemented on other computer systems (e.g., computer systems 1290).

In the illustrated embodiment, computer system 1200 also includes one or more persistent storage devices 1260 and/or one or more I/O devices 1280. In various embodiments, persistent storage devices 1260 may correspond to disk drives, tape drives, solid state memory, other mass storage devices, or any other persistent storage device. Computer system 1200 (or a distributed application or operating system operating thereon) may store instructions and/or data in persistent storage devices 1260, as desired, and may retrieve the stored instruction and/or data as needed. For example, in some embodiments, computer system 1200 may host a storage system server node, and persistent storage 1260 may include the SSDs attached to that server node.

Computer system 1200 includes one or more system memories 1220 that are configured to store instructions and data accessible by processor(s) 1210. In various embodiments, system memories 1220 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1225 that are executable by processor(s) 1210 to implement the methods and techniques described herein. In various embodiments, program instructions 1225 may be encoded in platform native binary, any interpreted language such as Java™ byte-code, or in any other language such as C/C++, Java™, etc., or in any combination thereof. For example, in the illustrated embodiment, program instructions 1225 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1225 may implement multiple separate clients, server nodes, and/or other components.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include data store 1245, which may be configured as described herein. For example, the information described herein as being stored by the database tier (e.g., on a database engine head node), such as a transaction log, an undo log, cached page data, or other information used in performing the functions of the database tiers described herein may be stored in data store 1245 or in another portion of system memory 1220 on one or more nodes, in persistent storage 1260, and/or on one or more remote storage devices 1270, at different times and in various embodiments. Similarly, the information described herein as being stored by the storage tier (e.g., redo log records, coalesced data pages, and/or other information used in performing the functions of the distributed storage systems described herein) or backup storage system may be stored in data store 1245 or in another portion of system memory 1220 on one or more nodes, in persistent storage 1260, and/or on one or more remote storage devices 1270, at different times and in various embodiments. In general, system memory 1220 (e.g., data store 1245 within system memory 1220), persistent storage 1260, and/or remote storage 1270 may store data blocks, replicas of data blocks, metadata associated with data blocks and/or their state, database configuration information, and/or any other information usable in implementing the methods and techniques described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems 1290 (which may implement one or more storage system server nodes, database engine head nodes, and/or clients of the database systems described herein), for example. In addition, network interface 1240 may be configured to allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices, configured to implement a plurality of storage nodes;
the plurality of storage nodes together implement a quorum set for a log-structured data store for processing write requests for data maintained in the log-structured data store, wherein the write requests for the data are considered durable when received and acknowledged at a write quorum threshold number of storage nodes of the plurality of storage nodes, wherein each of the plurality of storage nodes maintains a respective replica of a tail portion of a log for the data that includes a plurality of log records indicating previously received write requests for the data;
one or more of the plurality of storage nodes that maintain an incomplete view of the data, are each configured to:
determine that one or more log records in the respective tail portion of the log are durably persisted in a backup data store that maintains an archived version of the log for the data maintained in the log-structured data store; and
in response to said determining, reclaim storage space that maintains the one or more log records in the respective tail portion of the log in order to make the storage space available to store other data at the storage node;
wherein the one or more log records are maintained for a complete view of the data made available for read access in the respective log tail portions of one or more remaining storage nodes.

2. The system of claim 1, wherein each of the one or more storage nodes that maintains the complete view of the data is configured to:
receive a read request directed toward the data maintained in the log-structured data store;
access at least one of the one or more log records in order to service the read request; and
respond to the read request based, at least in part, on said accessing.

3. The system of claim 1, wherein at least one of the one or more storage nodes that maintains the complete view of the data is unavailable to service read requests, and wherein the system further comprises:
at least one additional storage node to be included in the quorum set, configured to:
receive additional log records that are not durably persisted in the backup data store via a peer-to-peer protocol;

receive the one or more log records from the backup data store to persist in a new respective replica of the tail portion of the log; and receive a restoration snapshot of the log from the backup data store on which the one or more log records depend in order for a complete view of the data to be made available for read access.

4. The system of claim 1, wherein the one or more computing devices implement a local redundant data store, wherein each of the plurality of storage nodes corresponds to a respective persistent storage device.

5. The system of claim 1, wherein the one or more computing devices are implemented as part of a distributed storage service, wherein the distributed storage service maintains different data for a plurality of storage clients, wherein at least one of the storage nodes that maintains the complete view of the data also maintains an incomplete view of different data for another storage client, and wherein at least one of the storage nodes that maintains an incomplete view of the data maintains a complete view of other data for a different storage client.

6. A method, comprising:
performing, by one or more computing devices:
receiving, at different ones of a plurality of storage nodes maintaining data as part of a quorum set, a plurality of write requests directed to the data, wherein each of the plurality of storage nodes maintains a respective replica of the data;
storing each of the plurality of write requests in the respective replica of the data maintained at each of the different ones of the plurality of storage nodes;
sending the plurality of write requests to be durably persisted in a backup data store that stores an archived version of the data maintained in the quorum set; and
in response to determining that the each of the plurality of write requests are stored in the backup data store, reclaiming storage space for the plurality of write requests in the respective replicas of the data maintained at one or more of the plurality of storage nodes in order to make the storage space available to store other data, wherein the one or more storage nodes maintain an incomplete view of the data, wherein one or more remaining storage nodes of the plurality of storage nodes different than the one or more storage nodes maintain the plurality of write requests in the respective replicas of the data as a complete view of the data for read access.

7. The method of claim 6, further comprising:
receiving, at one of the one or more remaining storage nodes, a read request directed toward the data maintained in the quorum set;
accessing the complete view of the data including the plurality of write requests at the one remaining storage node in order to service the read request; and
responding to the read request based, at least in part, on said accessing.

8. The method of claim 6, wherein the quorum set is implemented as part of a log structured data store, wherein each of the plurality of write requests are stored as one or more respective log records indicating the write request in the respective replica of the data, wherein said storing each of the plurality of write requests in the respective replica of the data maintained at each of the different ones of the plurality of storage nodes, comprises:

coalescing one or more initially stored log records together in order to generate a new log record indicating the write request to be stored in a coalesced portion of the data.

9. The method of claim 6, further comprising performing a peer-to-peer protocol for synchronizing the plurality of write requests among the plurality of storage nodes.

10. The method of claim 6, wherein at least one of the one or more remaining storage nodes is unavailable to service read requests, and wherein the method further comprises:
identifying an additional storage node to include in the plurality of storage nodes maintaining the data as part of the quorum set; and
obtaining at least some of the archived version of the data from the backup data store as part of a restoration operation to create a new replica of the data including the plurality of write requests to be made available as a complete view of the data at the additional storage node for servicing read requests.

11. The method of claim 6, wherein at least one of the one or more remaining storage nodes is unavailable to service read requests and wherein the method further comprises:
identifying an additional storage node to include in the plurality of storage nodes maintaining the data as part of the log-structured data store; and
obtaining the plurality of write requests from at least one of the available one or more remaining storage nodes as part of a restoration operation to create a new replica of the data to be made available as a complete view of the data at the additional storage node for servicing read requests.

12. The method of claim 6, wherein the plurality of storage nodes satisfy a write quorum threshold requirement in order to consider the plurality of write requests durable, and wherein the one or more remaining storage nodes of the plurality of storage nodes maintaining the complete view of the data for read access are less than a number of storage nodes sufficient to satisfy the write quorum threshold requirement, wherein the number of storage nodes sufficient to satisfy the write quorum threshold requirement is less than all of the plurality of storage nodes in the quorum set.

13. The method of claim 6, wherein the plurality of storage nodes satisfy a write quorum threshold requirement in order to consider the plurality of write requests durable, wherein the one or more storage nodes of the plurality of storage nodes maintaining the incomplete view of the data are available to receive and store subsequent write requests as one or more of storage nodes that satisfy the write quorum threshold requirement for the subsequent write requests.

14. The method of claim 6, wherein the plurality of storage nodes are implemented as part of a distributed storage system, wherein the distributed storage system is implemented across a plurality of different data centers, wherein at least one of the plurality of storage nodes is implemented in a data center of the plurality of data centers different than one or more other storage nodes of the plurality of storage nodes.

15. A non-transitory, computer-readable storage medium, storing program instructions that when executed by one or more computing devices cause the one or more computing devices to implement:
receiving, at different ones of a plurality of storage nodes maintaining data as part of a quorum set, a plurality of write requests directed to the data, wherein each of the plurality of storage nodes maintains a respective replica of the data;

storing each of the plurality of write requests in the respective replica of the data maintained at each of the different ones of the plurality of storage nodes;

sending the plurality of write requests to be durably persisted in a backup data store that stores an archived version of the data maintained in the quorum set; and in response to determining that each of the plurality of write requests are stored in the backup data store, reclaiming storage space for the plurality of write requests in the respective replicas of the data maintained at one or more of the plurality of storage nodes in order to make the storage space available to store other data, wherein the one or more storage nodes maintain an incomplete view of the data, wherein one or more remaining storage nodes of the plurality of storage nodes different than the one or more storage nodes maintain the plurality of write requests in the respective replicas of the data as a complete view of the data for read access.

16. The non-transitory, computer-readable storage medium of claim 15, wherein the program instructions cause the one or more computing devices to further implement:

receiving, at one of the one or more remaining storage nodes, a read request directed toward the data maintained in the quorum set;

accessing the complete view of the data including the plurality of write requests at the one remaining storage node in order to service the read request; and responding to the read request based, at least in part, on said accessing.

17. The non-transitory, computer-readable storage medium of claim 15, wherein said determining that each of the plurality of write requests are stored in the backup data store is based, at least in part, on an indication received at the one or more storage nodes that identifies archived write requests which have been durably persisted in the backup data store including the plurality of write requests.

18. The non-transitory, computer-readable storage medium of claim 15, wherein at least one of the one or more remaining storage nodes is unavailable to service read requests, and wherein the program instructions cause the one or more computing devices to further implement:

identifying an additional storage node to include in the plurality of storage nodes maintaining the data as part of the log-structured data store; and obtaining the respective log records from the backup data store as part of a restoration operation to create a new replica of the tail portion of the log for the data to be made available at the additional storage node for servicing read requests.

19. The non-transitory, computer-readable storage medium of claim 15, wherein at least one of the one or more remaining storage nodes is unavailable to service read requests, and wherein the program instructions cause the one or more computing devices to further implement:

identifying an additional storage node to include in the plurality of storage nodes maintaining the data as part of the quorum set; and obtaining at least some of the archived version of the data from the backup data store as part of a restoration operation to create a new replica of the data including the plurality of write requests to be made available as a complete view of the data at the additional storage node for servicing read requests.

20. The non-transitory, computer-readable storage medium of claim 15, wherein the plurality of storage nodes are implemented as part of a network-based distributed storage service of a network-based service platform, wherein the data is part of a larger collection of data maintained for a plurality of different clients of the network-based distributed storage service, wherein one of the plurality of different clients is a distributed database service that is also implemented as part of the network-based service platform.

21. The non-transitory, computer-readable storage medium of claim 15, wherein the plurality of storage nodes are implemented as part of a distributed data storage service, and wherein the one or more remaining storage nodes of the plurality of storage nodes maintaining the complete view of the data for read access satisfy a service performance threshold agreement for read requests at the distributed data storage service.

* * * * *